(12) United States Patent
Kielhofner et al.

(10) Patent No.: US 10,263,951 B2
(45) Date of Patent: *Apr. 16, 2019

(54) NETWORK ADDRESS FAMILY TRANSLATION METHOD AND SYSTEM

(71) Applicant: Star2Star Communications, LLC, Sarasota, FL (US)

(72) Inventors: Kristian Kielhofner, Lake Geneva, WI (US); Norman A. Worthington, III, Sarasota, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 15/586,758

(22) Filed: May 4, 2017

(65) Prior Publication Data

US 2018/0198754 A1     Jul. 12, 2018

Related U.S. Application Data

(63) Continuation-in-part of application No. 15/401,423, filed on Jan. 9, 2017, now Pat. No. 10,027,586.

(51) Int. Cl.
*H04L 29/12* (2006.01)
*H04L 29/06* (2006.01)
(Continued)

(52) U.S. Cl.
CPC .......... *H04L 61/2564* (2013.01); *H04L 12/66* (2013.01); *H04L 45/02* (2013.01);
(Continued)

(58) Field of Classification Search
CPC .................................................. H04L 45/741
See application file for complete search history.

(56) References Cited

U.S. PATENT DOCUMENTS 5,732,072 A * 3/1998 Thanner ................. H04L 45/02
    370/255
6,298,043 B1 * 10/2001 Mauger ............... H04L 12/5601
    370/230
(Continued)

OTHER PUBLICATIONS

Burger, Eric W., and Jan Seedorf. "Application-layer traffic optimization (ALTO) problem statement." (2009).; https://tools.ietf.ord/html/rfc5693.

(Continued)

*Primary Examiner* — Jimmy H Tran
(74) *Attorney, Agent, or Firm* — Katharyn E. Owen

(57) ABSTRACT

The present invention, generally, is directed towards sending and receiving communication sessions across more than one network using an address family translation or network address translation (NAT) system and method. Such application is directed towards providing the ability to send and receive communications sessions between communication nodes, network edge devices, and the like, using more than one Internet protocol. This application is especially advantageous where communication sessions need to be transferred from one location to a second using the public Internet, i.e., Internet access provided by third-party Internet service providers (ISPs). The present invention, also, provides a translation system and method which may allow a communication node or a network edge device to recognize and interpret communication sessions received over a third-party Internet connection from a device hidden by a third party ISP-provided NAT implementation.

24 Claims, 5 Drawing Sheets

(51) Int. Cl.
*H04L 12/751* (2013.01)
*H04L 12/721* (2013.01)
*H04L 12/66* (2006.01)

(52) U.S. Cl.
CPC .......... *H04L 45/14* (2013.01); *H04L 61/2514* (2013.01); *H04L 61/2585* (2013.01); *H04L 61/2592* (2013.01); *H04L 63/029* (2013.01); *H04L 63/0428* (2013.01); *H04L 65/1006* (2013.01); *H04L 65/1069* (2013.01); *H04L 65/608* (2013.01); *H04L 69/16* (2013.01); *H04L 65/80* (2013.01)

(56) References Cited

U.S. PATENT DOCUMENTS

| | | | |
|---|---|---|---|
| 7,465,231 B2 | 12/2008 | Lewin | |
| 8,149,716 B2 | 4/2012 | Ramanathan | |
| 8,184,620 B2* | 5/2012 | Dusch | H04L 29/06027 370/352 |
| 8,228,861 B1* | 7/2012 | Nix | H04W 36/00 370/329 |
| 8,289,979 B2 | 10/2012 | Hiie | |
| 8,325,638 B2 | 12/2012 | Jin | |
| 8,351,333 B2 | 1/2013 | Rao | |
| 8,369,213 B2 | 2/2013 | Vasseur | |
| 8,392,583 B2 | 3/2013 | Bijwaard | |
| 8,493,931 B1* | 7/2013 | Nix | H04W 36/00 370/331 |
| 8,649,369 B2* | 2/2014 | Lundberg | H04L 47/25 370/352 |
| 8,675,493 B2 | 3/2014 | Buddhikot | |
| 8,737,371 B2 | 5/2014 | Velev | |
| 8,767,532 B2 | 7/2014 | Vasseur | |
| 879,803 A1 | 8/2014 | K T | |
| 8,879,426 B1* | 11/2014 | Quilling | H04W 40/20 370/245 |
| 8,930,552 B2 | 1/2015 | Ueno | |
| 9,491,004 B2 | 11/2016 | Park | |
| 2002/0010798 A1* | 1/2002 | Ben-Shaul | G06F 17/3089 709/247 |
| 2004/0003117 A1* | 1/2004 | McCoy | A63B 53/04 709/246 |
| 2004/0004938 A1* | 1/2004 | Buddhikot | H04L 45/12 370/238 |
| 2004/0006613 A1 | 1/2004 | Lemieux et al. | |
| 2004/0246975 A1* | 12/2004 | Joshi | H04L 45/02 370/395.31 |
| 2004/0253948 A1* | 12/2004 | Laberteaux | H04W 84/00 455/422.1 |
| 2005/0261062 A1* | 11/2005 | Lewin | A63F 13/12 463/42 |
| 2006/0133337 A1* | 6/2006 | An | H04W 8/082 370/338 |
| 2006/0187866 A1* | 8/2006 | Werb | G01D 4/004 370/311 |
| 2006/0268727 A1* | 11/2006 | Rangarajan | H04L 45/00 370/248 |
| 2007/0094325 A1* | 4/2007 | Ih | A63F 13/12 709/203 |
| 2007/0127421 A1* | 6/2007 | D'Amico | H04W 72/005 370/338 |
| 2007/0208737 A1* | 9/2007 | Li | H04L 67/26 |
| 2007/0291744 A1* | 12/2007 | Lundberg | H04L 47/25 370/352 |
| 2008/0025230 A1* | 1/2008 | Patel | H04L 41/5022 370/252 |
| 2008/0137591 A1* | 6/2008 | Hirano | H04L 63/18 370/328 |
| 2008/0151746 A1* | 6/2008 | Vasseur | H04L 12/4633 370/228 |
| 2008/0159271 A1* | 7/2008 | Kutt | H04L 12/66 370/352 |
| 2008/0186873 A1* | 8/2008 | Pujet | H04L 12/5692 370/254 |
| 2008/0201488 A1* | 8/2008 | Kenner | H04L 67/1008 709/245 |
| 2009/0129316 A1* | 5/2009 | Ramanathan | H04L 45/123 370/328 |
| 2009/0158362 A1* | 6/2009 | Kajos | H04N 7/17318 725/91 |
| 2009/0172174 A1* | 7/2009 | Zha | H04L 12/2874 709/228 |
| 2010/0016008 A1* | 1/2010 | Brewer | H04W 4/10 455/518 |
| 2010/0091707 A1* | 4/2010 | Janneteau | H04W 8/082 370/328 |
| 2010/0142373 A1* | 6/2010 | Jin | H04L 12/14 370/230 |
| 2010/0142646 A1* | 6/2010 | Hensley | H04L 1/0026 375/316 |
| 2010/0150028 A1* | 6/2010 | Campbell | H04L 12/2852 370/255 |
| 2010/0211689 A1* | 8/2010 | Bijwaard | H04N 21/6405 709/228 |
| 2010/0260192 A1* | 10/2010 | Hiie | H04L 45/00 370/400 |
| 2010/0272062 A1* | 10/2010 | Velev | H04W 8/082 370/331 |
| 2010/0278069 A1* | 11/2010 | Sharma | H04L 45/02 370/254 |
| 2010/0315992 A1* | 12/2010 | Turanyi | H04W 8/082 370/315 |
| 2010/0317284 A1* | 12/2010 | Charbit | H04B 7/2606 455/7 |
| 2010/0325299 A1* | 12/2010 | Rao | H04L 1/1854 709/230 |
| 2011/0153843 A1* | 6/2011 | Hsu | H04W 80/04 709/227 |
| 2011/0289230 A1* | 11/2011 | Ueno | H04L 45/42 709/228 |
| 2011/0320588 A1* | 12/2011 | Raleigh | H04W 36/245 709/224 |
| 2012/0044949 A1* | 2/2012 | Velev | H04W 8/082 370/401 |
| 2013/0103791 A1* | 4/2013 | Gottdenker | H04L 67/02 709/217 |
| 2013/0159432 A1* | 6/2013 | Deering | G06Q 10/107 709/206 |
| 2013/0166625 A1* | 6/2013 | Swaminathan | H04N 21/64738 709/203 |
| 2014/0269333 A1* | 9/2014 | Boerjesson | H04L 45/123 370/238 |
| 2014/0293787 A1* | 10/2014 | Bourdelles | H04W 40/248 370/235 |

OTHER PUBLICATIONS

Mell, Peter, and Tim Grance. "The NIST definition of cloud computing." (2011). APA.

Dillon, Tharam, Chen Wu, and Elizabeth Cheng. "Cloud computing: issues and challenges." Advanced Information Networking and Applications (AINA), 2010 24th IEEE International Conference on. Ieee, 2010. APA.

Zäpfel, Günther, and Michael Wasner. "Planning and optimization of hub-and-spoke transportation networks of cooperative third-party logistics providers." International journal of production economics 78.2 (2002): 207-220.

Fall, Kevin. "A delay-tolerant network architecture for challenged internets." Proceedings of the 2003 conference on Applications, technologies, architectures, and protocols for computer communications. ACM, 2003.

\* cited by examiner

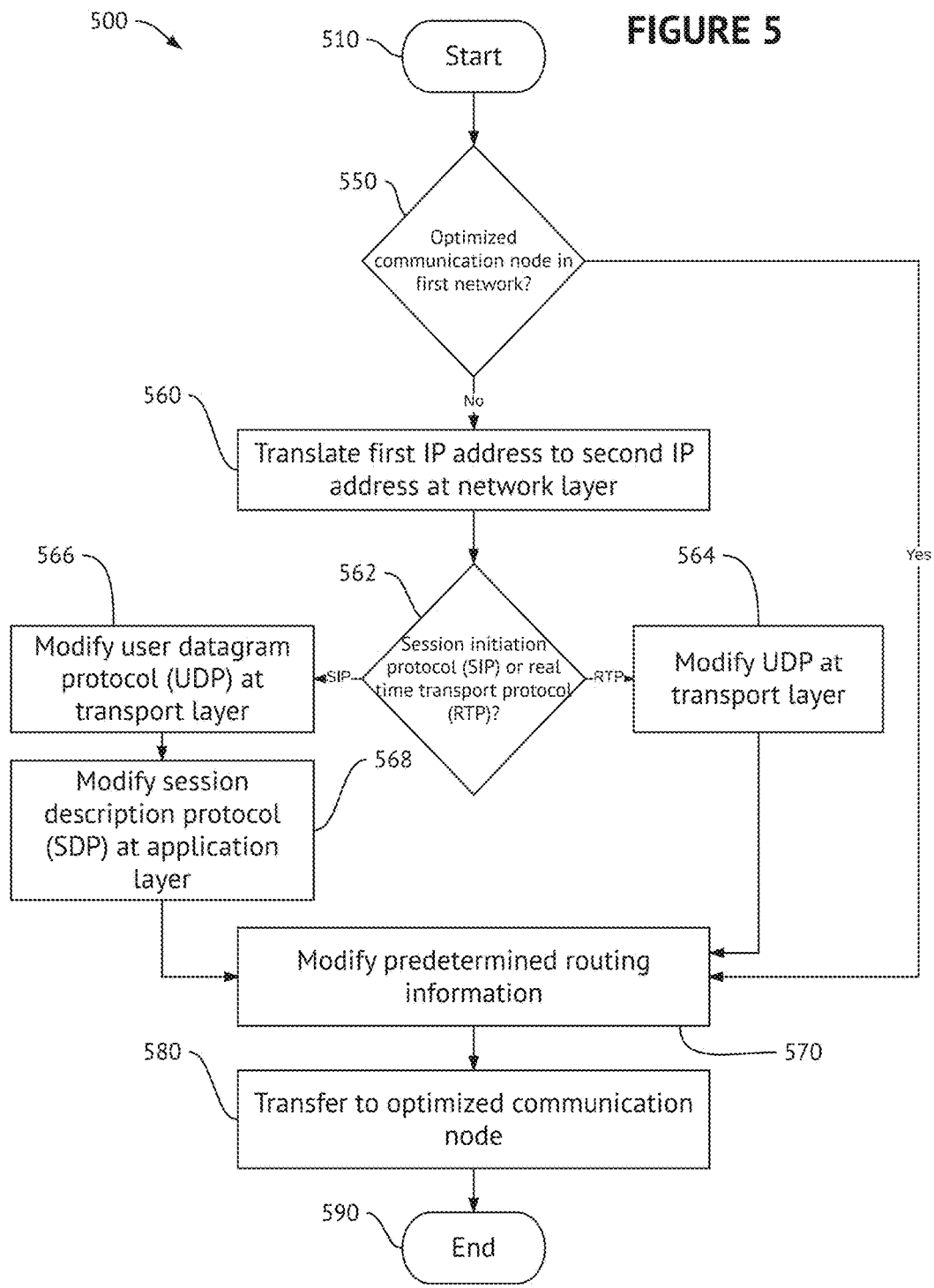

NETWORK ADDRESS FAMILY TRANSLATION METHOD AND SYSTEM

PRIORITY

This application is a continuation-in-part application of U.S. patent application Ser. No. 15/401,423 filed Jan. 9, 2017, titled "Address Family Translation Method and System" and claims the benefit of and priority to such application under 35 U.S.C. § 120.

FIELD OF THE INVENTION

The present methods and systems relate generally to electronic communication systems, particularly to managing communication sessions end-to-end, from an originating source to a terminating destination, where the communication sessions involve delivery of application data (e.g., audio (voice) data, audio/video data, electronic file downloads, etc.) over one or more third party networks which have more than one address family as well as include public and private networks.

BACKGROUND OF THE INVENTION

Communication nodes, more generally known as computing devices (e.g., servers, network switches, routers, and the like), which are connected to either or both of a public and private network commonly are each assigned Internet Protocol (IP) addresses, to both locate and identify the nodes for communications with other nodes on that same network. Under the fourth and primary version of the Internet, known as "IPv4," the pool of unallocated IP addresses in the IPv4 address family is rapidly diminishing (due, in part, to factors such as poor planning; the ubiquity of Internet-capable devices, such as smartphones; and network expansion into developing countries, such as China and India). IP address depletion in the IPv4 address family has been anticipated since the late 1980s, and a successor protocol, Internet Protocol version 6 or "IPv6," has been developed and deployed as of 1993, which provides a larger address pool. IPv4 and IPv6, however, are not designed to be interoperable, complicating the transition to IPv6 from IPv4. Many Internet service providers (ISPs) provide rudimentary solutions, including network address translation or "NAT" services, which generally includes remapping one IP address space into another. NAT services are also a popular method to allow private network address space (such as a business' internal network) to masquerade as one publicly routable IPv4 address at a single location (i.e., one router), instead of allocating a public address to each network device. When IP address information is modified at the packet level, however, the quality of Internet connectivity may suffer. NAT implementations by ISP vary widely and are not commonly documented by vendors of equipment containing the implementations. Many "un-IPv6-aware" NAT implementations often break native communications, as well as have other Quality of Service (QoS) issues. Therefore, a more reliable and cross-family operable method and system to send and receive communications sessions between communications nodes using both protocols over Internet provided by third-party ISPs are needed. Furthermore, a method and system to recognize and correctly interpret communications sessions sent and received over third-party Internet connections from a device hidden by a third party ISP-provided NAT implementation are also needed.

SUMMARY OF THE INVENTION

It is, therefore, an object of the present invention to provide a method for optimizing a communication session from a first network comprising at least one first communication node to a second network comprising at least one second communication node. It is another object of the present invention to provide a system, comprising a communication node including a hardware processor, which utilizes this method as computer executable instructions for the communication node.

The present invention may optionally operate within a number of communications and network environments, for example, but in no way limited to, the public Internet, a private Internet or Intranet, a network on one side of a third-party provided address family translation or network address translation (NAT) implementation, a network on a second side of a third-party provided NAT implementation, a data transport network or a series of networks, a communications network or series of networks, a non-optimized communications network or series of networks, an optimized communications network or series of networks, and the like.

In one aspect of the exemplary method, a first communication node can receive an at least one session parameter indicating initiation of the communication session, the at least one session parameter can comprise an originating node network type identifying the first network, a session criteria, a session type, and a predetermined routing information for routing the communication session.

In another exemplary aspect of this method, the predetermined routing information can include a destination node network type identifying a network within which a destination node is located.

In another aspect of the exemplary method, a first communication node can retrieve a list of communication nodes, containing all possible communication nodes in both the first network and in the second network, from a local communication node, through which the communication session can be routed. This list of communication nodes can have a prioritization, based at least in part on a session criteria and a session type of each of the all possible communication nodes.

In yet another aspect of the exemplary method, a first communication node can identify, based on a set of business rules stored and executed by a processing unit of the first communication node, an optimized communication node from a list of communication nodes. If the set of business rules is executed, the processing unit can analyze the list of communication nodes based at least in part on an at least one session parameter of a communication session and a prioritization of the list of communication nodes.

In still another aspect of the exemplary method, a first communication node can determine if the optimized communication node is within the first network or within the second network.

In an additional aspect of the exemplary method, a first communication node can, after determining the optimized communication node is within a second network, modify at least one abstraction layer of a communication session, based on a set of business rules, by modifying at least one implementation instruction for a set of functionality of the at least one abstraction layer to allow transmission of the communication session from the first communication node within the first network to the optimized communication node within the second network.

In a last aspect of the exemplary method, a first communication node can modify the predetermined routing information further comprising the destination node network type to identify the second network. Thereafter, the communication session can be transmitted from the first communication node within the first network to the optimized communication node within the second network.

The following are either or both additional and exemplary aspects of the present exemplary method, one or more of which can be combined with the basic inventive method as embodied above:

the first communication node is at least one of an originating node, an intermediary node, and a destination node;

the first communication node can detect an at least one network address translation occurring at an at least one third communication node and initiate an encrypted communication tunnel to a remote destination node, in this case, the at least one third communication node can be upstream from the first communication node, and following the initiation of the encrypted communication tunnel, a portion of the predetermined routing information of the communication session can be modified to transmit a portion of the communication session to the remote destination node;

the first communication node can further comprise a session border controller, in this case, if the first communication node determines the optimized communication is within the second network, the first communication node acts as a gateway proxy between the first network and the second network;

modifying the at least one implementation instruction for the set of functionality of the at least one abstraction layer comprises a translation at a network layer of a first Internet Protocol (IP) address to a second IP address based on at least one of the set of business rules, a determination the optimized communication node is within the second network, at least one transport layer protocol, and the at least one session parameter;

modifying the at least one implementation instruction for the set of functionality of the at least one abstraction layer comprises modifying at a transport layer a user datagram protocol (UDP) by a translation of at least one of a source service port and a destination service port based on at least one of the business rules, a determination the optimized communication node is within the second network, the session type of the communication session, and at least one application layer protocol; and the at least one application layer protocol comprises at least one of a real-time transport protocol (RTP) and a session initiation protocol (SIP);

modifying the at least one implementation instruction for the set of functionality of the at least one abstraction layer comprises modifying at an application layer a session description protocol (SDP) containing at least one of a communication session announcement, a communication session invitation, and a session parameter negotiation data, wherein the modification at the application layer is based on at least one of the set of business rules, a determination the optimized communication node is within the second network, the session type of the communication session, a translation at a network layer, and a modification at a transport layer.

modification of the application layer occurs when the communication session at the application layer comprises at least one of an RTP and a SIP;

modification of the application layer occurs if the translation occurs at the network layer or the modification occurs at a transport layer; and modification of the application layer occurs if the translation occurs at the network layer and the modification occurs at the transport layer;

rerouting the communication session from the first communication node if the communication session has a modified session description protocol, wherein rerouting the communication session comprises modifying inbound predetermined routing information of the communication session for a destination node.

In another exemplary embodiment, a system for optimizing a communications session from a first network to a second network is further contemplated. This exemplary system can comprise a local communication node database for storing a list of communication nodes in both the first network and the second network, a first communication node which is operatively coupled to the local communication node database and includes a hardware processor which can be operative to execute any or all, in any order and combination, the basic inventive concept as embodied in the above exemplary method and the additional and exemplary aspects as stated above.

These and other exemplary aspects of the present basic inventive concept are described below. Those skilled in the art will recognize still other aspects of the present invention upon reading the included detailed description.

DETAILED DESCRIPTION OF THE DRAWINGS

The present invention is illustrated by way of example, and not limitation, in the figures depicted in the following drawings.

FIG. 5 illustrates one exemplary aspect of the present invention, an exemplary method for transferring a communication session from a first network to a second network.

DETAILED DESCRIPTION OF THE INVENTION

Figure 1:
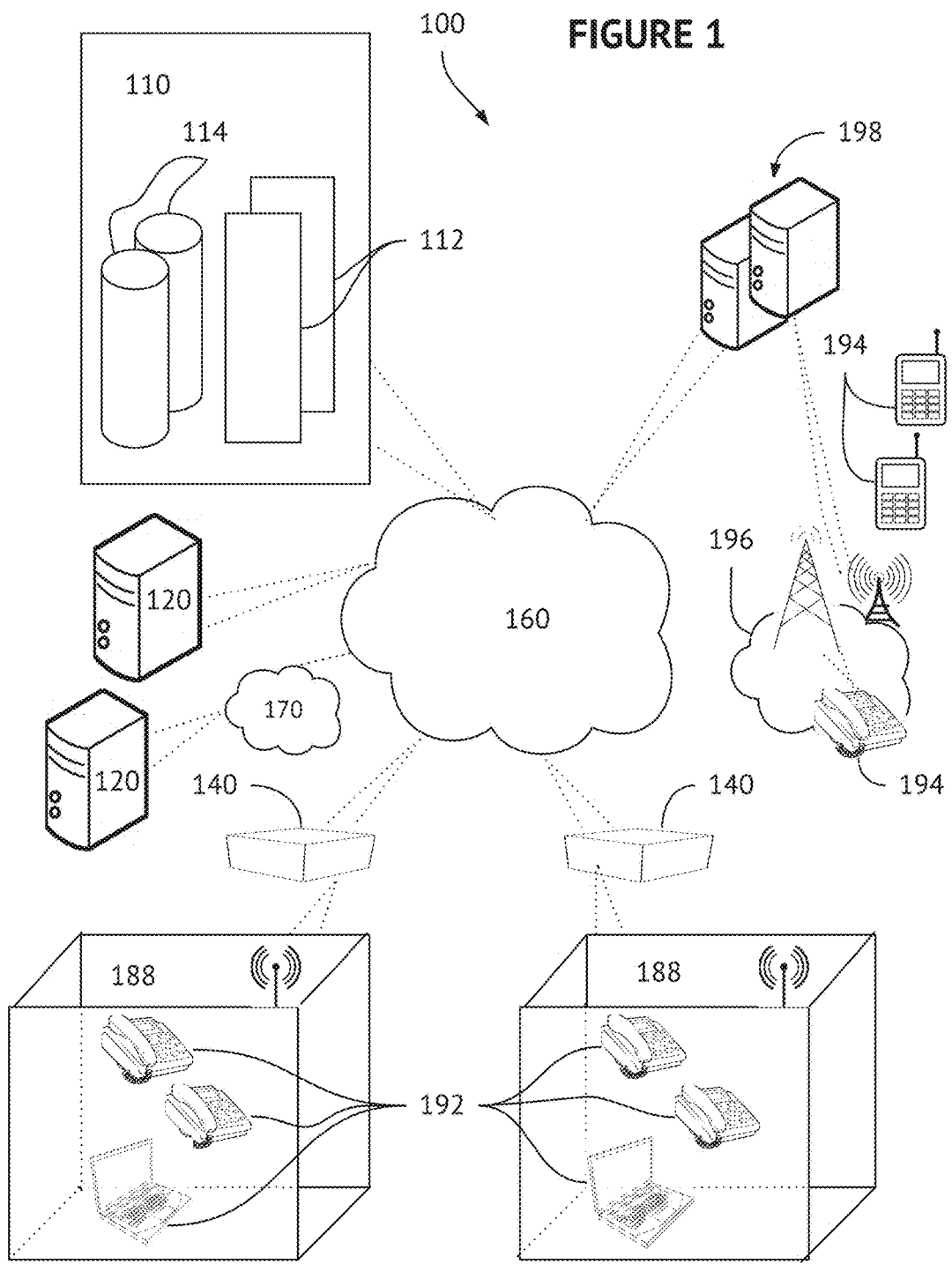
FIG. 1 illustrates by way of example a communications system environment within which the present invention may operate.

The present invention will now be described more fully herein with reference to the accompanying drawings, which form a part of, and which show, by way of illustration, specific exemplary embodiments through which the invention may be practiced. This invention may, however, be embodied in many different forms and should not be construed as limited to the exemplary embodiments set forth below. Rather, these exemplary embodiments are provided so that this disclosure will be thorough and complete, and will fully convey the scope of the invention to those skilled in the art. Among other things, the present invention may be embodied as methods, systems, and devices. Accordingly, various exemplary embodiments may take the form of entirely hardware embodiments, entirely software embodiments and embodiments combining software and hardware aspects. The following detailed description, is, therefore, not to be taken in a limiting sense.

Throughout this specification and claims, the following terms take the meanings explicitly associated herein, unless the context clearly dictates otherwise. The phrase "in one embodiment" does not necessarily refer to the same embodiment, though it may. Furthermore, the phrase "in another embodiment" does not necessarily refer to a different embodiment, although it may. As described below, various embodiments of the invention may be readily combined, without departing from the scope or spirit of the invention.

In addition, the term "or" is an inclusive "or" operator and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The following briefly describes the embodiments of the invention in order to provide a basic understanding of some aspects of the invention. This brief description is not intended as an extensive overview. It is not intended to identify key or critical elements or to delineate or otherwise narrow the scope. Its purpose is simply to present some concepts in a simplified form as a prelude to a more detailed description that is presented later.

The present invention, generally, is directed towards sending and receiving communication sessions across more than one network using an address family translation or network address translation (NAT) system and method. Such application is directed towards providing the ability to send and receive communications sessions between communication nodes, network edge devices, and the like, using more than one Internet protocol. This application is especially advantageous where communication sessions need to be transferred from one location to a second using the public Internet, i.e., Internet access provided by third-party Internet service providers (ISPs). The present invention, also, provides a translation system and method which may allow a communication node or a network edge device to recognize and interpret communication sessions received over a third-party Internet connection from a device hidden by a third party ISP-provided NAT implementation.

Below, exemplary embodiments of these systems and methods will be provided in conjunction with the attached drawings. The written description below will begin with reference to FIG. 1 and will include a high-level, generalized description of a "communication system" in which the present invention can be practiced. FIGS. 2 through 5 thereafter will discuss various aspects of the present invention, in more detail.

FIG. 1 illustrates an embodiment of a communication system 100, which is an exemplary environment in which the present inventive concept and its individual elements can be practiced, constructed and operated, in whole, in part, and in any order or combination. Communication system 100 includes optimized communication servers or "OCS" 110, communication nodes 120, other communication nodes 140, networks 160, and networks 170. Communication system 100, generally, involves the connection of the various elements and components described herein for the transmission of communication sessions via electronic transfer of data over one or more third party networks, which generally includes transfer through a series of communication nodes.

A communication session generally comprises data packets (either or both signaling and data packets) passed using a communication protocol and generally relating to one or more of the following non-exhaustive application types: audio only; audio and video; audio and data; or any combination of audio, video, and data over a digital medium. One knowledgeable in the art should understand that the phrase "communication session" is generally synonymous with the term "connection." As such, it should be realized that one exemplary embodiment of communication system 100, can include, but is not limited to, an IP-based communication system architecture that provides one or more users with an end-to-end, fully managed and monitored system for transporting audio, video, and other data traffic over third party networks. For purposes of this specification and the claims, it should be understood that a stream of incoming and/or outgoing communication sessions may also be referred to as "application data traffic", "media traffic", "communication traffic", or simply "traffic", at various places in this disclosure.

As illustrated, communication system 100 comprises a plurality of components in addition to OCS 110, communication nodes 120, other communication nodes 140, networks 160, and networks 170, for example, facilities 188 which house one or more communication assets 192 (each individually an asset 192 or collectively assets 192) for providing communication sessions (i.e., both incoming and outgoing), associated with assets 192. Within this exemplary embodiment, communication sessions may be between the illustrated assets 192, and between assets 192 and one or more assets 194 (each individually an asset 194 or collectively assets 194), and assets not shown. It should be understood that a communication session between assets 192, 194, and assets not shown can be, for example, in a two-party manner, or can involve other assets (also not shown) in a multi-party manner, such as, in a multi-asset (i.e., multi-user) communication session. In this exemplary embodiment, as shown in FIG. 1, communication sessions originating or terminating from assets 192 are managed and operated by OCS 110, whether or not assets 192 are geographically distributed across multiple facilities 188. However, in alternate embodiments, it is possible that OCS 110 handles communication sessions for both types of asset 192, 194. Also, it will be understood that in alternate embodiments the assets 194 are not limited by connection to a traditional switched telephone network or "PSTN," such as PSTN 196, as shown in FIG. 1. For example, in such embodiments, assets 194 can be connected directly (i.e., without PSTN 196) to a network, such as networks 160, 170.

In FIG. 1, two exemplary facilities 188 are shown. But it will be understood that this is for illustrative purposes only. According to aspects of this disclosure, assets are not necessarily tied to facilities, no relation necessarily exists between various facilities (not shown), and facilities 188 can be located in different geographical locations. Communication sessions involving assets 192 located in such facilities 188 occur via one or more networks 160, 170 and are typically associated with one or more of the following, by way of example and not limitation, a web-deployed service with client/service architecture, a cellular data network, a cloud-based system, secure networks, and gateways/firewalls that provide information security, and the like. Moreover, as will be understood and appreciated, various networking components (not shown in FIG. 1) such as routers, switches, hubs, and the like, are generally also involved in transmitting communication sessions.

Assets 192, 194 generally are defined as electrical or electronic equipment that is connected to an IT infrastructure and that enables electronic communications (e.g., communication sessions). For example and in no way by limitation, assets 192, 194 may comprise any singular or combination of a VoIP phone, a mobile phone, a fax machine, a conventional Plain Old Telephony System (POTS) phone, a smart phone, a cordless phone, a conference room speakerphone, a computer, a Bluetooth-enabled phone, a laptop, audio/video conferencing equipment, electronic gaming equipment, a printer, or more generally, any kind of computing device which can connect to a network and from which a user can operatively practice a communication function. Further, in locations such as facilities 188, analog overhead paging systems may be utilized. Such legacy systems (including existing communications circuits that transmit data at speeds around 1.544 megabits per second, also known as "T1" circuits or POTS trunks) can be integrated with OCS 110 via adapters (not shown). As will be understood and appreciated, there is no limitation imposed on the number of assets, asset types, brands, vendors, and manufacturers, etc. that may be used in connection with embodiments of the present disclosure.

In a general or traditional communications network, an outgoing communication session will travel from asset 192 via one or more networks 160, 170, through the IP-PSTN gateways 198 where IP traffic is converted into telephony traffic and is finally delivered to asset 194 or another asset (not shown). The reverse happens for an incoming communication session. As will be discussed in reference to this FIG. 1, additional configurations of communication traffic will be illustrated, for example, generated via assets (not shown), and passed from communication nodes 120 to networks 160, 170. Additional embodiments contemplate communication traffic generated via assets 192 and passed from other communication nodes 140 to networks 160, 170. In one example, incoming traffic to facilities 188 may be directed to other communication nodes 140 for eventual delivery to specific assets 192. In an alternative example, incoming traffic may be redirected to an automated attendant, call queues, voicemail, and/or an off-premises device (e.g., a user's mobile phone or home phone).

According to one embodiment, and as shown in FIG. 1, OCS 110 may be connected to one or more communication nodes 120, other communication nodes 140, and networks 160, 170. Through these connections, as shown, OCS 110 can be operatively connected to one or more of the facilities 188, and in additional exemplary embodiments, one or more remotely-located OCS server modules 112 and OCS databases 114. Thus, assets 192 are managed and controlled by OCS 110 via OCS server modules 112, communication nodes 120, and other communication nodes 140 via networks 160, 170. In contrast and for purposes of illustration only, assets 194 are intended to represent assets that are not managed and controlled by OCS 110. In one embodiment, OCS 110 monitors and collects real-time and historical network characteristics, applies business rules related to networks 160, 170 characteristics, evaluates various communication session routes/paths, and if necessary modifies communication routes to account for the application of business rules and real-time networks 160, 170 characteristics.

OCS server modules 112, as shown in FIG. 1, are intended to be any singular or collection of computer servers or communication nodes that provide a suite of hosted services to create a complete, feature-rich communication system. As such, OCS server modules 112 may comprise any combination of computing components, by way of example, but in no way required or limited to, processing units (CPUs), mass memory, buses, RAM, ROM, and other storage means (all of which are not shown for simplicity purposes). In this exemplary embodiment, mass memory may include an example of computer readable storage media for storing information such as computer-readable instructions, data structures, program modules or other data, basic input/output system ("BIOS") for controlling low-level operations of OCS server modules 112, as well as an operating system for controlling the operation of OCS server modules 112. It should be appreciated that these components may include a general-purpose operating system such as a version of UNIX® or LINUX™. The operating system may include, or interface with, Java virtual machine modules that enable control of either or both hardware components and operating systems operations, via Java application programs.

As depicted in FIG. 1, OCS databases 114 are intended to be any singular or collection of computer servers or communication nodes for storing data associated with providing communication sessions. One embodiment of OCS databases 114 comprises a directory further comprising information identifying characteristics relating to various communication nodes. Non-limiting examples of such directory information include, IP addresses of the respective communication nodes, a type of classification of such communication nodes, a network type (i.e., which of a variety of available networks a communication is in and/or associated with) and a type of application data (i.e., audio, video, data, or any combination thereof) the respective communication node processes. OCS databases 114, in one example, may be relational, which can be defined as tabular databases with data defined so that it may be reorganized and accessed in a number of ways, and in another example distributed, which can be defined as dispersed or replicated databases located among different points in the networks. These examples, however, are exemplary only and OCS database 114 can have any other configuration which is operably functional for OCS 110 or communication system 100.

In FIG. 1, as shown, communication nodes 120 are operatively connected to the OCS 110, OCS server modules 112 and OCS databases 114 via one or more networks 160, 170, including but not limited to the Internet, another public network, and a private network. In general, communication nodes 120 can be any type of IP-enabled device that connects to a network (such as networks 160, 170) and enables communication sessions. As referred to throughout this specification and the claims, communication nodes 120 can be, but are not limited to, nodes that are "compliant" with OCS 110, which is a communication node either or both operated and managed, or capable of being controlled, managed, or manipulated by an embodiment of OCS 110, or nodes that are not compliant with OCS 110, which can be nodes which cannot be either or both operated and managed, or capable of being controlled, managed, or manipulated by an embodiment of OCS 110. Non-limiting examples of communication nodes 120 include network edge devices (which can be, in one exemplary embodiment, other communication nodes 140), provisioning servers, route servers, media proxy servers, statistics servers, and the like. In contrast, by way of example, communications nodes which are not compliant with OCS 110 include PSTN nodes, such as PSTN 196 and IP-PSTN gateway 198, which are ordinarily nodes that are maintained by third party ISPs, and the like.

According to an embodiment, communication nodes 120 receive information relating to a plurality of network elements (not shown for simplicity purposes) via OCS server modules 112 and OCS databases 114. In additional embodiments, communication nodes 120 can also receive business rules that dictate communication session optimization criteria. In further embodiments, the business rules that dictate communication session optimization may also be stored at communication nodes 120. This aspect of the present invention will be discussed with reference to FIG. 3, below. In one embodiment, information in the OCS databases 114 is collected by components of the OCS server modules 112, and provided to communication nodes 120, 140, or other nodes (not shown), with such information used, at least in part, for determining optimal communication session routes or paths in combination with business rules, as will be better understood from the discussions in connection with FIGS. 3 and 5.

In FIG. 1, as shown, other communication nodes 140 are operatively connected to the OCS server modules 112 and OCS databases 114 via one or more networks 160, 170, such as the Internet. In general, other communication nodes 140 are one example of communication nodes 120. However, other communication nodes 140 can also include, but not be limited to, general purpose computers, dedicated PBX servers, network-attached component devices, or other specific computing devices or servers that operate "OCS-compliant" applications and software. Other communication nodes 140, in one example, generally include at least one operative connection to one or more assets 192. Other communication nodes 140, additionally, can be generally identified with several attributes, for example, a device identifier, a device type, a network address, a network type, a location, and the like, which will be discussed in more detail below with reference to FIGS. 4 and 5.

In additional embodiments, other communication nodes 140 can be self-contained, compact, energy-efficient communication nodes running proprietary software from flash memory or a Solid State Drive (SSD) that provide QoS (Quality of Service) guarantees to communication traffic associated with assets 192. In such embodiments, other communication nodes 140 are generally responsible for collecting networks 160, 170 characteristics, including but not limited to, packet loss, round trip times, transfer speed, jitter, and the like, and interact with applications running on assets 192 and associated IT Infrastructures. Generally, other communication nodes 140 are operatively connected to OCS server modules 112 and OCS databases 114 via networks 160, 170, to exchange optimal routing information on a periodic or continual basis. One knowledgeable in the art will understand that other communication nodes 140, in further contemplated embodiments, can be the same as communication nodes 120, and/or can have the same or substantially the same functionality as communication nodes 120. It should be further understood that while a network edge device, such as other communication nodes 140, can be the same as communication nodes 120, communication nodes, such as communication nodes 120, are not the same as or synonymous with other communication nodes 140 in all circumstances.

According to one aspect, other communication nodes 140 are generally used to gather information about the assets 192 and conditions of networks 160, 170 in a periodic manner to assess characteristics of potential communication paths and other network conditions. It will be appreciated by one skilled in the art that because of the complex interconnections of a large number of networks with varying network characteristics and the way information is routed through network elements, as is illustrated in one example according to a "guarantee-less paradigm" of IP generally, the quality of communication sessions occurring via networks 160, 170 is generally unpredictable and unreliable. For example, some nodes, one exemplary representation being communication nodes 120 and other communication nodes 140, may be down or damaged, some nodes may have faster computational capabilities over other nodes, some nodes encounter more network congestion than other nodes, some communication nodes may only accept and/or allow the transfer of communication sessions having one address family type, some communication nodes may only be operatively functional within a public and/or private network, and the like. OCS 110, as presently disclosed may, among other things, be used to monitor the quality of networks 160, 170 to provide reliable and optimized communication sessions between assets, for example, assets 192, 194.

In additional embodiments, communication nodes 120 and other communication nodes 140, respectively, can operatively connect or "sit" on the edge of a series of communication nodes which comprise a network, which for ease of illustration is not depicted in FIG. 1 (e.g., as illustrated, communication nodes 120, 140 are operably connected to networks 160, 170, without being specifically illustrated as "within a series of communication nodes." It should be readily understood that this is intended though not illustrated). In these embodiments, the series of communication nodes which comprise the network can be defined as a private network, otherwise known as a network that uses private IP address space, in one example including but not limited to, home, office, and enterprise local area networks (LANs) uses. In these exemplary embodiments, addresses in the private space are not allocated to any specific organization and anyone may use these addresses without approval from a regional Internet registry. However, data packets (which comprise a communication session) addressed from the private network cannot be transmitted through the public Internet, and so, if such a private network needs to connect to the Internet, it must do so via a network address translator gateway or a proxy server. Additional embodiments of communication nodes 120,140 further comprise proxy and/or gateway functionality in the manner, for example, of session border control protocol and/or software. How communications are transmitted between a private network and the public Internet according to the inventive concept will be discussed in more detail with reference to FIGS. 2 through 5.

It will be further understood that the terms "networks," "at least one network," or "networks 160," or "networks 170" as used herein generally include any kind of computer-enabled, IP-enabled, or other digital network for transporting data and/or traffic associated with communication sessions, and generally include a network in a system of interconnected computing devices, nodes, and/or assets. In one example, a network includes the Internet that is a global system of interconnected computers that use the standard Internet protocol suite to serve users worldwide with an extensive range of information resources and services. It should also be understood that the term "Internet" as used herein and generally, in reality, is a network of networks consisting of millions of private, public, academic, business, and government networks, of local to global scope, that is linked by a broad array of electronic, wireless and optical technologies. As described in reference to this specification and the claims, communication nodes and network edge devices generally connect to networks, and networks may comprise one or more communication nodes and network edge devices as illustrated in these exemplary embodiments, for example, communication nodes 120, other communication nodes 140, networks 160, and networks 170.

Usually, such networks are offered as commoditized services by third-party Internet service providers (ISPs) and include a plurality of one or more third party sub-networks that are usually owned by third party network providers or third party carriers. Such sub-networks can be hard-wired or wireless, including but not limited to, cellular, optical fiber, Wi-Fi, WiMax, proprietary networks, and the like, as should occur to one skilled in the art. It should also be understood by one skilled in the art that networks 160, 170 can further include PSTN nodes such as IP-PSTN gateways 198 at the boundary of IP networks, and PSTN 196 for conversions between PSTN traffic and IP traffic.

As will be described in greater detail herein, it will be understood that further embodiments provide the functionality of determining and enabling optimal communication session routes for incoming and outgoing communication sessions associated with various applications (e.g., voice-based applications, video-based applications, multimedia-based applications, file download applications, email applications, etc.) and across one or more, but at least one network. Such communication session routes/paths may comprise a plurality of either or both intermediary and forwarder nodes via networks 160, 170. For purposes of this specification and as used throughout this specification and the claims, it should be noted that the communication node may optionally be an originating node, one from which a communication session is initiated, an intermediary node, one which is along the path (i.e., route) through which the communication session is routed (e.g., neither an originating or destination node), or a destination node, one at which a communication session terminates. Networks, as used in this specification, may optionally be a first network comprising a first series of communication nodes and/or a second network comprising a second series of communication nodes.

Once an optimal communication session route is established (with or without intermediary nodes), data associated with the respective communication session is routed along this optimal route from the originating node or source node to the destination node or terminating node. It should be understood and appreciated that the intermediate nodes can be compliant with OCS 110 or nodes that are maintained or operated by third party communication providers, such as PSTN nodes 196, 198. It should be noted that an optimized node may, for example, and as is contemplated in various embodiments of the inventive concept, may comprise one of a first series of nodes within a first network, and/or may comprise one of a second series of nodes within a second network.

Figure 2:
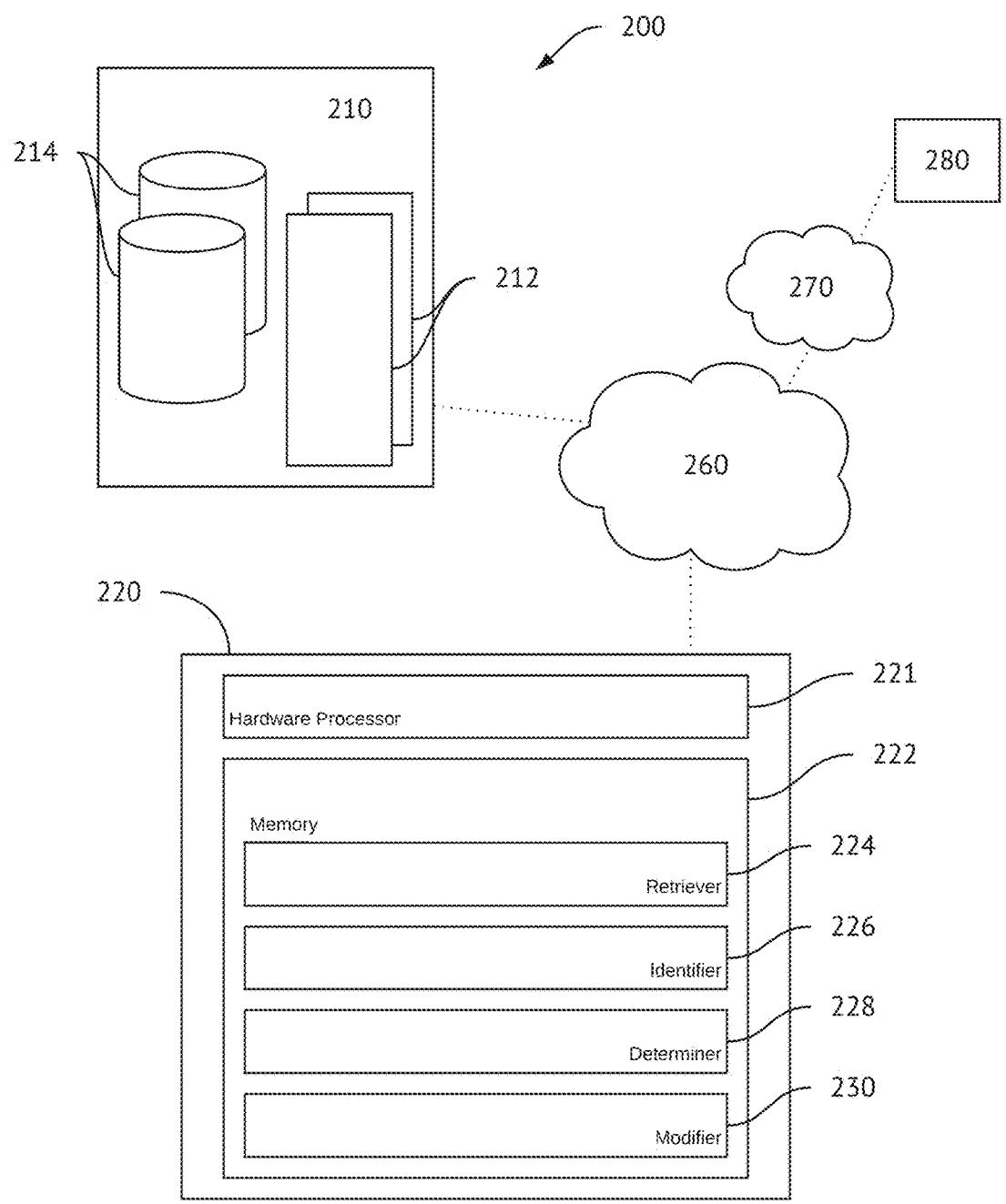
FIG. 2 illustrates one exemplary embodiment of the present invention, a system for optimizing a communication session from a first network to a second network.

FIG. 2 illustrates one exemplary aspect of communication system 100, as illustrated above with reference to FIG. 1, here a system 200 for optimizing communication sessions from a first network comprising a first series of communication nodes to a second network comprising a second series of communication nodes.

As illustrated, system 200 comprises a plurality of components, including OCS 210, the communication node 220, networks 260, networks 270, and "other" or optimized communication node 280. For simplicity of illustration, this exemplary embodiment does not depict other network and system components, such as network edge device(s), IP-PSTN gateway(s), PSTN(s), facilities or assets, however, each, all or any combination thereof of these components are contemplated for use as part of or in conjunction with system 200. In this exemplary embodiment, communication sessions may be initiated, terminated or otherwise transmitted through system 200 in the same or similar manner as described with reference to FIG. 1. Also for ease of illustration, one knowledgeable in the art should understand that communication node 220 and optimized communication node 280 can, optionally, represent one, at least one, one or more, a plurality, or a series of communication nodes. Furthermore, communication node 220 and optimized communication node 280 can be, for example, at least one communication node within a series of communication nodes comprising a network, and, optionally, be representative thereof. Additional embodiments are contemplated in which communication node 220 and optimized communication node 280 each, respectively, comprises a separate network.

In one embodiment as illustrated in FIG. 2, OCS 210 monitors and collects real-time and historical network characteristics, applies business rules related to networks 260, 270 characteristics, evaluates various communication session routes/paths, and if necessary modifies communication routes to account for the application of business rules and real-time networks 260, 270 characteristics. Likewise, OCS server modules 212 are intended to be the same or similar to OCS server modules 112 as described and illustrated in more detail with reference to FIG. 1.

OCS databases 214, which may also be described as "communication node databases" or "local communication node databases" (both of which, for the purposes of this specification and the claims, are synonymous with OCS databases 214), as illustrated in this exemplary embodiment, are contemplated to be any singular or collection of computer servers or communication nodes for storing data associated with initiating, routing, and/or terminating communication sessions. OCS databases 214, in one example, may be relational or distributed, depending on the searching, organization, and modification requirements of administrator(s) or users. Further embodiments contemplate OCS databases 214 having content or structure as required by system 200, or in yet still additional embodiments, determined at the option of, based on a set of predetermined or dynamic business rules, system 200. These examples, however, are exemplary only and OCS databases 214 can have any configuration which is functionally necessary for OCS 210 or system 200 to operate.

In one exemplary aspect of the present embodiment, as illustrated in FIG. 2, OCS databases 214 can be locally accessible by other system 200 components (shown and not shown) and can store a directory or list of communication nodes in a first network, such as, for example, networks 260, and, in additional embodiments, communication nodes in a second or other networks, such as, for example, networks 270, through which a communication session may be routed. OCS databases 214, for example, store information needed by OCS 210, such as, for example, list, directory, or other databases comprising information identifying communication nodes that are either or both known and capable of being either or both controlled and managed by OCS 210. In one embodiment, communication nodes, such as communication node 220 and other communication nodes (not shown), can include originating nodes or source nodes, intermediary nodes, destination nodes or terminating nodes, as well as nodes that are potential "next-hop" relays.

In one exemplary embodiment, OCS database 214 provides a "picture" of the geography and routing infrastructure of available networks, such as, for example, networks 260, 270, all or any of which can be operated and maintained by a plurality of third party service providers and carriers. In one embodiment, such a picture is evaluated on the basis of metrics such as pathway or connection quality, round trip times, jitter, packet loss rate, bandwidth, geographical location of communication nodes, and other metrics which are functionally necessary for system administrators or users to communicate within system 200. According to one exemplary embodiment, OCS databases 214 can be maintained and updated in a periodic manner by OCS server modules 212, by way of example, and not of limitation, by a provisioning server, a routing server, a statistics server, a network sampling server (all not shown individually, except as is intrinsic in the structure of OCS modules 212), and the like. As should occur to one of ordinary skill in the art, "periodic" can be every hour, minute, virtually continuously, or the like. It is contemplated that information contained in OCS databases 214 is shared with communication node 220, other communication nodes (not shown), and OCS server modules 212, any or all of which may require the information. In this and other exemplary embodiments, such information can be used for determining optimal or optimized communication session routes in combination with business rules, as will be better understood from the discussion below.

As further illustrated in FIG. 2, OCS databases 214 are operatively coupled to communication node 220 via networks 260. Furthermore, communication node 220 comprises a hardware processor 221 which is operative to execute computer readable instructions stored in a memory 222. Additional elements, software(s), application(s), hardware, peripherals and structural components are further contemplated to be required for the functional enablement of communication node 220, however, such elements, software(s), application(s), hardware, peripherals and structural components are not illustrated (for simplicity purposes only). Such elements, software(s), application(s), hardware, peripherals and structural components may include but are not limited to, ports, buses, other input/output interfaces, displays, general use applications, operating system(s), and the like, or any such elements and structural components which are functionally necessary to adequately enable operation of communication node 220.

As also discussed with reference to FIG. 1, communication node 220 as illustrated in FIG. 2 can be operatively connected to function as a gateway and/or proxy, or "sit" on the edge of networks 260, 270 for the purposes of routing a communication session to, from, or through networks 260, and for example, a second network, which may optionally include networks 270, or other networks, one either or both can be, in exemplary embodiments, public and/or private networks. It is further contemplated in additional embodiments that communication node 220 functions as a part of one or more networks, for example, as a part of both a first network and a second network, such as, in this example, networks 260 and networks 270. Additional embodiments are contemplated where optimized communication node 280 has the same or substantially the same features and/or functionality as communication node 220, and in these exemplary embodiments, can also act in the same manner (i.e., sit on the edge of network and/or function as a gateway and/or proxy).

Hardware processor 221 can be generally defined as the central processing unit (CPU) of communication node 220, or the electronic circuitry within communication node 220 (or any other computing device) that carries out the computer-executable instructions stored in memory 222, by performing basic operational functions, including but not limited to, for example, the basic arithmetic, logic, control and input/output (I/O) operations (if any) specified by the instructions.

Memory 222, as depicted in FIG. 2, may further comprise location(s) for operational components, application(s), software(s) and other computer executable instructions (any or all of which, as discussed above, are generally accessed from memory 222 by hardware processor 221). Memory 222 can generally be defined as the computing hardware device or devices used to store information for immediate use in a computing device; such as communication node 220, and is commonly synonymous with the term "primary storage" or the descriptive term "storage." Memory 222, for example, operates at various speeds, such as in one example, random-access memory (RAM) which operates at a high speed, whereas other storage methods provide slow-to-access program and data storage but offer higher storage capacities. Other non-limiting examples of memory include non-volatile memory such as, flash memory, read-only memory (ROM), programmable read-only memory (PROM), erasable programmable read-only memory (EPROM), electrically erasable programmable read-only memory (EEPROM), and the like, and volatile memory such as dynamic random-access memory (DRAM), static random-access memory (SRAM), other CPU cache memory, and the like. Other types of memory can also include but are not limited to, secondary storage devices such as hard disk drives and solid-state drives, which may be wired to or wirelessly coupled to a communication node 220.

Memory 222, as illustrated, may also comprise retriever 224, identifier 226, determiner 228, and modifier 230. Memory 222 may further comprise additional operational elements not stated or illustrated as part of this specification, however, memory 222 is contemplated to act as a storage location for all functionally necessary elements which require storage when such elements are necessary for the functional enablement of communication node 220. Hardware processor 221 can access retriever 224, identifier 226, determiner 228, and modifier 230, each individually, one at a time, in any combination of grouping(s), and simultaneously, or in any other order or grouping as is functionally necessary to execute operations as dictated by other system 200 components, for example, such as OCS 210 or networks 260.

Communication session(s) can be initiated at communication node 220, by communication node 220 receiving one or more, but at least one, session parameter which includes an indication of initiation for the communication session. In this exemplary instance, session parameter(s) may include, but are not limited to, an originating node network type identifying a network, a session criteria, a session type, and predetermined routing information for routing a communication session further comprising a destination node network type identifying a network. By way of non-limiting example, if a communication session originates from a communication node within a series of communication nodes comprising a first network, for example, networks 260, the originating node network type as contemplated would identify networks 260. Additionally, for purposes of this specific example, the predetermined routing information including a destination node network node can, for sake of illustration, identify a second network, such as networks 270.

Communication session initiation and session parameters at communication node 220 will be discussed in more detail with reference to FIG. 3, below.

In one embodiment, as illustrated in FIG. 2, hardware processor 221 accesses memory 222 to operably execute computing instructions embodied as retriever 224. Retriever 224 allows communication node 220 to actively retrieve from OCS databases 214 a list of communication nodes containing all possible communication nodes in or operatively connected to networks 260, 270 through which the communication session can be routed. In this exemplary embodiment, the list of communication nodes can be prioritized, at least in part, on a session criteria of each of the all possible communication nodes and a session type of each of the all possible communication nodes. Session criteria and session type(s) for the all possible communication nodes will be discussed in more detail with reference to FIG. 3, below.

In one embodiment, the list of communication nodes can represent either or both potential and preferred "next-hop" nodes for a variety of session types. Additional embodiments are contemplated where the list of communication nodes can be generated based on an evaluation of the outcome of the evaluation utilizing the set of business rules, "real-time" conditions of networks 260, 270, other communication node outage(s), and the like. Therefore, it should be appreciated that a list of communication nodes can be, for example, prioritized, overruled, or otherwise modified based on several factors. In further embodiments, updates, review, evaluation, and modification of the list of communication nodes can occur both periodically and frequently. Specifically, each of the all possible communication nodes can be prioritized every minute, every ten minutes, every hour, or the like. Other embodiments contemplate processing requirements and computational efficiency, where updates, review, evaluation, and modification only occurs once per day or week, and the like. In yet still other embodiments, updates, review, evaluation, and modification may occur virtually continuously.

Examples of information that can be maintained for each of the all possible communication nodes includes, but is not limited to, IP addresses of the respective communication nodes, network type, network location, types of classifications of such nodes, and type(s) of application data (e.g., audio, video, data, or any combination thereof) each respective communication node processes. Generally, information collection or classification (or "class" or "forking class") of communication nodes is a way of associating a predefined "communication-related feature," such as, for example and in no way limited to, voice mail, interactive voice response (IVR), conference calling, and other such features with one or more servers, such as a voice mail server, an IVR server, a conference server, and the like. In one embodiment, classification can be predefined by system users and/or system administrators (as defined below). In other embodiments, classification can be based on the computing capabilities of the all possible communication nodes, the number of communication nodes for a given class that, in one example, are already pre-existing in a given geographical area, and so on. In yet other embodiments, classification can be based on having the same number of communication nodes in every information category.

Additional embodiments are further contemplated where the list of communication nodes is stored at the communication node, for example, communication node 220.

As illustrated in FIG. 2, hardware processor 221 can access memory 222 to operably execute computing instructions embodied as identifier 226. In this exemplary embodiment, identifier 226 allows communication node 220 to actively identify an optimized communication node 280 from the list of communication nodes. Identifier 226, as part of the identification process, utilizes a set of business rules received to or stored at communication node 220 to analyze the list of communication nodes. This analysis or identification using the set of business rules can involve, but is not required to involve, a comparison (one or more comparisons, but at least one, for functional enablement of the present embodiment) involving any combination of the following information: the predetermined routing information of the communication session, a session criteria of the communication session, a session criteria associated with each of the all possible communication nodes, a session type of the communication session, and a session type associated with each of the all possible communication nodes. The method of identification, analysis, comparison, and the like, occurring at communication node 220 involving each of the elements above, as well as descriptions of each said elements, will be detailed below with reference to FIG. 3.

Optimized communication node 280, as illustrated in FIG. 2, is a communication node having the same or similar elements, software(s), application(s), hardware, peripherals and structural components as communication node 220, and may include but is not required to include, hardware processors, memories, ports, buses, other input/output interfaces, displays, general use applications, operating system(s), and the like, or any such elements and structural components which are functionally necessary to adequately enable operation of optimized communication node 280. Additional embodiments are further contemplated where optimized communication node 280 is also communication node 220, in the event that these exemplary communication nodes 220, 280 are each "virtual" elements of the same computing device.

Yet still further embodiments are contemplated where optimized communication node 280 is a network edge device, such as, for example, other communication nodes 140 illustrated in FIG. 1, or any combination of a series of connected network edge devices, in which, in this exemplary instance, other communication nodes 140 may be one or more devices. Further embodiments are contemplated where optimized communication node 280 is a network edge device, such as other communication nodes 140, which is also communication nodes 220, 280 in the event that these exemplary communication nodes are each "virtual" elements of the same computing device. It is further contemplated that optimized communication node 280 can "sit" on an edge of a network, such as, for example, networks 270, and can act as a gateway and/or proxy in the same, substantially the same, or in a different manner than communication 220, by, in one example, execution of a proxy protocol such as session border control or similar.

Generally, business rules can be defined as computer executable instructions, code, and scripts that define and represent policies and criteria that govern various aspects of communication sessions. Examples of such criteria include but are not limited to an Internet bandwidth requirement, a maximum tolerable packet loss rate, one or more allowable applications, a number of active assets and other devices (not shown) simultaneously engaged in communication sessions at a destination location or operably connected to a communication node, a maximum tolerable delay in voice data transfers, a maximum tolerable jitter, a minimum video frame rate, allowable geographical locations of intermediate nodes, and the like. Business rules, as illustrated by exemplary embodiments herein, are commonly defined by users within a system, for example, communication system 100 (shown in FIG. 1) and system 200, or system administrators. A "system user" can primarily be defined as a person who operates a computing device or a network service, such a computing system, software product, or the like. This term is often synonymous with "end user," and is distinguished from developers of a system (who enhance the system or software) as those who only use the system or software. A "system administrator," on the other hand can primarily be defined as a person who is responsible for the upkeep, configuration and operation of a computing system, including database systems, such as OCS databases 214, and general servers, such as OCS server modules 212. A system administrator may also maintain network infrastructure, such as switches and routers, as well as web server services that allow for internal and external access to websites associated with a system or network, such as, for example, communication system 100, system 200, and the like.

Additional embodiments are contemplated where the set of business rules stored at communication node 220 are determined at the communication node based on any number of outside factors, including but not limited to networks 260, 270 condition(s) and networks 260, 270 event(s). A "network condition" is often synonymous with the term "communication session criteria" or "session criteria," which will be described in more detail with reference to FIG. 3. A "network event," such as an event occurring within networks 260, 270, can primarily be defined as an occurrence that warrants modification of an otherwise functional communication session path for a given communication session. Examples of network events include, but are not limited to, power outages, node failures, communication tower failures or damage, natural disasters impacting nodes or groups of nodes, routine or unscheduled maintenance associated with nodes, terrorist attacks, and virtually any other event or occurrence affecting an otherwise optimized communication node, such as optimized communication node 280, or route.

As described with reference to the exemplary embodiment illustrated in FIG. 2, business rules are typically stored at communication node 220, in a location at least in part, defined as memory 222, and can be functionally practicable with any one or more, in any combination, order, or organization, with any elements contained in memory 222, for example, identifier 226, determiner 228, and modifier 230. Additional embodiments contemplate the business rules being stored at a wired or wirelessly connected, remote location, such as, for example, a cloud storage or remote server (not shown) operably coupled to communication node 220.

Hardware processor 221 in FIG. 2 can also access memory 222 to operably execute computing instructions embodied as determiner 228. In this exemplary embodiment, determiner 228 allows communication node 220 to actively determine, based on the set of business rules either or both received to or stored at communication node 220, if the identified optimized communication node 280 is within a first network or a second network. When and how the analysis and determination of a network type and/or location occur at communication node 220 will be discussed in more detail with reference to FIG. 3, below.

In one embodiment, whether optimized communication node 280 is within a first network or a second network (for sake of example, networks 260,270, respectively), can be determined based on an IP address assigned to optimized communication node 280. As should be apparent to one skilled in the art, every computing device operatively coupled to a network, for example, computers, routers, switches, communication nodes, and the like, are assigned an IP address that is used to locate and identify the device, especially when it is "in communication" with other devices on the network. If a device has several network interfaces, then each interface will have at least one distinct IP address assigned to it. For example, a laptop might have a wireless network interface and a wired network interface using a network cable, and this would require a total of two IP addresses. Furthermore, it is also possible that an interface can be assigned more than one IP address, for various reasons. Where this can be problematic is where a network is a private network, which when used in this context, can mean a series of communication nodes which collectively have a singular IP address which is associated with a representative communication node, essentially defining the network as a series of communication nodes "hidden" behind a representative communication node.

It should be further understood that an IP address can represent a public Internet location identifier, for example, located in a first network, such as, for example, networks 260. As used herein, an IP address can also, optionally, represent a private network location identifier, for example, located in a second network, including but not limited to, networks 270. When used in this fashion, in particular embodiments as contemplated by this specification, a single IP address located in a second network, such as networks 270, can represent any or all of the following: at least one communication node, one or more communication nodes, and a plurality of communication nodes, that, in this representative example, comprise "a second series of communication nodes." In this manner, network 270, or any other private network, is considered a "hidden" network in which a single IP address acts as a location identifier representing the entire private network.

FIG. 2 further illustrates modifier 230, which hardware processor 221 can access memory 222 to operably connect to. Modifier 230 can have a two-fold functionality of modifying one or more, but at least one, of a communication session's abstraction layers and modifying a communication session's predetermined routing information. Modifier 230, in such embodiments as exemplified in FIG. 2, can modify either or both of an abstraction layer and predetermined routing information based on any of the following individually or in conjunction with one another, by way of example and in no way limited to: the predetermined routing information, the session parameters of the communication session, the set of business rules, a session criteria of optimized communication node 280, and a session type of optimized communication node 280. When and how analysis and modification occur at communication node 220 will be discussed in more detail with reference to FIGS. 4 and 5, below.

The operation of certain aspects of the inventive concept as illustrated in the exemplary embodiment depicted in FIG. 2 will now be described with respect to FIG. 3. FIG. 3, as described below, illustrates a logical flow diagram generally showing one embodiment of a process or method for optimizing a communication session from a first network to a second network, for example, the devices and systems described above in reference to FIGS. 1 and 2. Method 300 of FIG. 3 can be implemented in part, or whole, within network communication node 220 of FIG. 2, or in additional embodiments, such as, for example, other communication nodes 140, as illustrated in FIG. 1. Furthermore, it is contemplated that steps can be either or both added and removed from method 300. The following detailed description is, therefore, not to be taken in a limiting sense, and various embodiments envisioned by either or both adding and removing steps in the process may be readily combined, without departing from the scope or spirit of the invention.

As contemplated by this exemplary method 300, communication nodes within one, either, or both networks may be assigned an "IP address" to identify the device or at least a portion of the device. This IP address or "IP location descriptor" can provide for the network transportation of application data from one computing device to another via the one or more networks, for example, first networks 260 and second networks 270 as illustrated in FIG. 2. In additional embodiments, it is further contemplated that the network through which application data may be transported is, in one example, a first network, however, in additional embodiments it is contemplated that the network is either of a first network or a second network, or in the alternative a first network and a second network. Additional embodiments further contemplate the first IP address contemplating at least one of a first network location, a second network location, another network location, or any combination thereof. Definitions may further include, for example, those stated above. In this particular context, a first IP address can specify the transport provider of a specific protocol and in further embodiments, a network type, i.e., whether a device is within a first network, a second network, or another network. Also in this context, each communication node, whether individually or within a series of communication nodes that comprise a network, i.e., a first series of communication nodes comprising the first network and/or a second series of communication nodes comprising the second network, can be known as a host and has a unique IP address.

Figure 3:
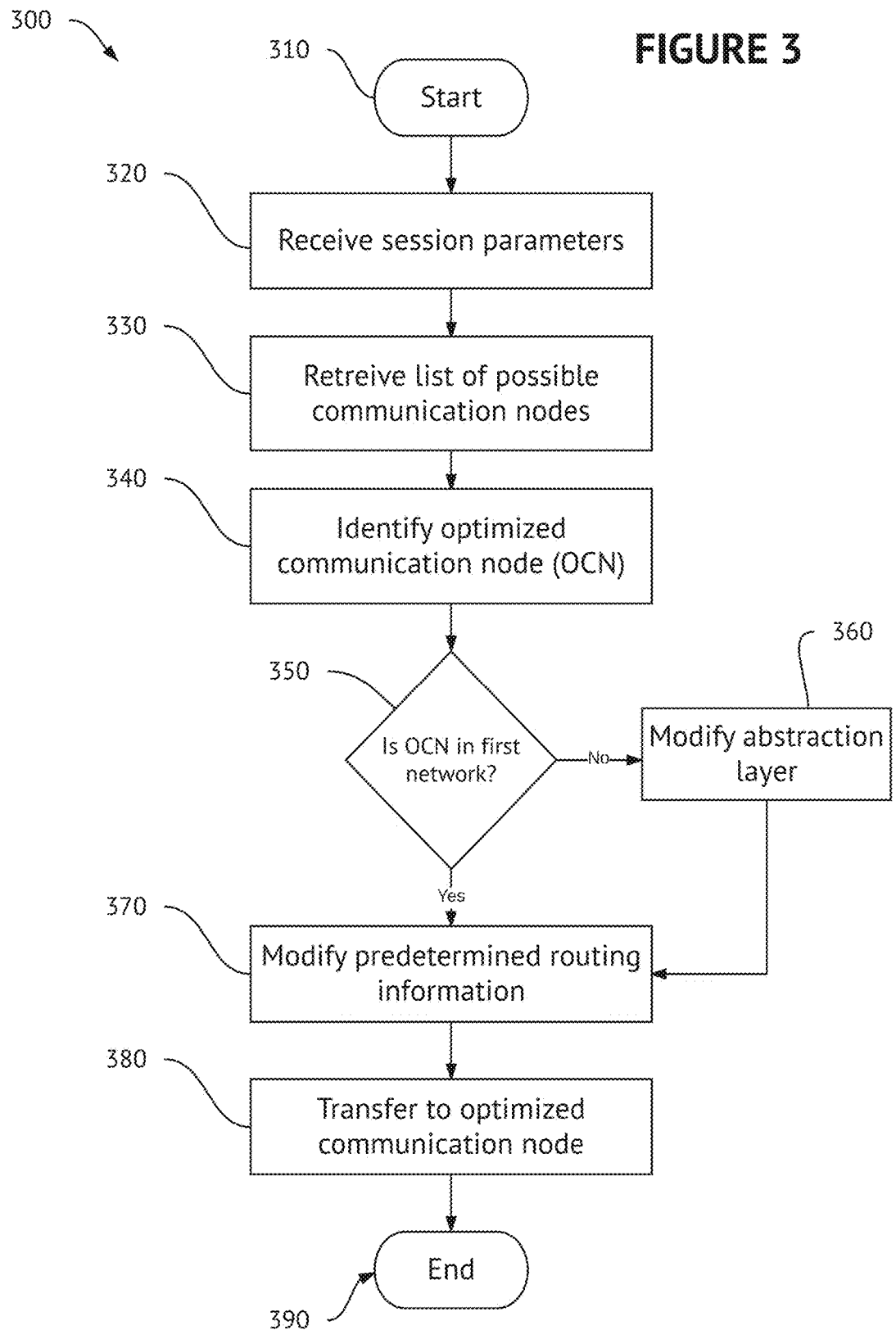
FIG. 3 illustrates one exemplary embodiment of the present invention, a method for optimizing a communication session from a first network to a second network.

As illustrated in FIG. 3, method 300 starts at 310. Thereafter, at 320, a communication node, which may be independent or within a series of communication nodes, receives at least one session parameter indicating initiation of a communication session. As illustrated in this exemplary method 300, the at least one session parameter received by the communication node at 320 may comprise each individually, or any combination of the following features: an originating node network type identifying a first network; a session criteria; a session type; and predetermined routing information for routing the communication session further comprising a network type of a destination node.

A session parameter, as used throughout this specification and the claims, can generally be defined as information pertaining to and defining a specific communication session. By way of example and not in limitation, a session parameter can also comprise any or all of the following: a destination node for the communication session; a communication session type; an originating asset of a communication session; session criteria corresponding to or preferable for a specific communication session; and the like.

Also in the context of this exemplary embodiment, as well as used throughout this specification and the claims, the predetermined routing information can primarily be defined as a routing information protocol (RIP), which, in generalized terms, is a dynamic protocol used to find the best route or path from end-to-end (e.g., originating node to destination node) for a communication session over a network, for example, networks 160, 260, 170, 270. In this exemplary embodiment, a RIP can find the best route by using a routing metric or a "hop count" algorithm. In this exemplary embodiment, the routing metric or hop count algorithm can be used, in one example, to determine the shortest path from the originating node to the destination node, which allows the communication session to be delivered in the shortest time. In additional embodiments, a different routing protocol is contemplated wherein the routing information protocol finds a best route or path from end-to-end for a communication session irrespective of the network in which the communication session originated, in one example, the originating node is in a first network and the destination node is within a second network. Additional embodiments are contemplated where another routing protocol is considered, which determines a best route or path via an algorithm which contemplates at least one of or a combination of one or more of: a hope count; communication session origination and/or originating node network type; a session type; and a session criteria A session criteria can be generally defined as one or more, but at a minimum, at least one, rule or principle for evaluating a network, such as for example, networks 160, 260, 170, 270. As embodied herein, the rules and principles can be interpreted as network conditions or other characteristics that are used as factors for determining "criteria" to optimize individual communication sessions or classes of communication sessions through the various network routes available. Examples of session criteria can include, but are not limited to, bandwidth requirements, a maximum tolerable packet loss rate, one or more allowable applications, number of active on-premises devices simultaneously engaged in communication sessions, a maximum tolerable delay in voice data, a maximum tolerable jitter, a minimum video frame rate, allowable geographical locations of intermediate nodes, and the like. Generally, it is contemplated that session criterion can have an impact (i.e., require modifications or revisions to) on business rules, and vice versa.

Also as used throughout this specification and the claims, a session type can conventionally be defined as a predetermined class or categorization of a communication session. Examples of communication session types include but are not limited to, voice-based sessions, video-based sessions, multimedia-based sessions, file download sessions, email sessions, and the like.

Once a session parameter initiating a communication session is received at a communication node at step 320, the communication node can thereafter retrieve a list of communication nodes from a local communication node database at 330. The local communication node database, in this exemplary embodiment, may have the same or similar attributes as described with reference to OCS databases 114, 214, as attributed in more detail in FIGS. 1 and 2. The list of communication nodes may contain, in one exemplary embodiment, all possible communication nodes within either or both of a first network and a second network through which the communication session may be routed. In one exemplary embodiment, the list of communication nodes may contain, for example, all communication nodes within a certain geographical distance, and in one specific example, "next-hop" communication nodes. Further exemplary embodiments contemplate the list of communication nodes to include inclusive catalog(s) of communication nodes, such as, for example, all communication nodes which meet a certain network type, a certain session criteria, all communication nodes which accept a certain communication session type, all communication nodes within all available networks, such as, for example, networks 160, 260, 170, 270 and other networks, and the like. Further embodiments contemplate this list being dynamically modified, either or both at the local communication node database and at the communication node, based on any number of limiting characteristics, by way of example and not in limitation, a session parameter or a combination of session parameters of a given communication session (e.g., as required by the predetermined routing information further comprising a destination node network type), a communication session type, an originating node network type, and the like.

The list of communication nodes can be, for example, generated in light of various other factors, such as, but not limited to, real-time network conditions, various communication node outage(s), and the like. Therefore, it will be appreciated that a predetermined list of communication nodes can be prioritized, overruled, or otherwise modified based on several factors. In addition, it should be understood that the process described in connection with FIG. 3 can occur either or both periodically and frequently as can be determined by necessity and at the discretion of a system administrator or user. Specifically, the process by which communication pathways or routes and corresponding communication nodes can be prioritized can operate every minute, every ten minutes, every hour, or the like. In some embodiments, for the sake of processing requirements and computational efficiency, method 300 may only be performed once per day or week, or other extended time periods. In other embodiments, method 300 may occur virtually continuously. It should be even further appreciated that this methodology of generating a prioritized list of communication nodes helps eliminate communication session routes that have been impacted by communication failures, or communication tower problems due to disaster, natural calamities, routine maintenance, or some other unpredictable reason.

At 330, it is further contemplated that the list of communication nodes can be prioritized based on attributes of the all possible communication nodes contained in the list. For example, and not in limitation, embodiments are contemplated where the list of communication nodes is prioritized either or both (or any proportional combination of parts thereof) on one or more, but at least one, network type associated with each of the communication nodes, session criteria associated with each of the communication nodes, and a session type associated with each of the communication nodes. In additional embodiments, prioritization of the all possible communication nodes can include fewer or additional elements, for example, an address family or address families accepted at a communication node, network conditions, network events, either or both of system administrator and/or network user requirements, predetermined business rules stored in the local communication node database, business rules stored at the communication node, and the like.

At 340, the communication node can thereafter identify an optimized communication node from the list of communication nodes based on a set of business rules either or both received by or stored at the communication node. As used in the context of this exemplary method 300, throughout this specification, and the claims, business rules can primarily be defined as a computer executable instruction or set of instructions, coding, scripts, or specific criteria indicating one or more actions, stored in a memory element associated with a communication node and executed at the communication node by a processor or similar computing hardware element (described in more detail below with reference to FIG. 4), with respect to optimizing communication sessions for a given communication node or communication nodes. Business rules can also optionally be defined as including instructions for obtaining network information to further enable optimization of communication sessions involving the delivery of application data over third party networks, such as the public Internet, or similarly over private networks. In one aspect, by way of example and not limitation, business rules define information needed to optimize certain communication sessions, ways to obtain such information, how to process such information, path (i.e., route) and/or node ranking methodologies, and include other similar types of information. Such actions dictated by business rules may be associated with satisfaction of a set of communication session criteria or conditions.

At 340, the set of business rules can be used, in one exemplary embodiment, to analyze the list of communication nodes based on any number of attributes and characteristics, including but not limited to: predetermined routing information associated with a communication session, with the routing information further comprising a destination node network type, one or more session criteria associated with a communication session, one or more session criteria associated with each of the all possible communication nodes, one or more session type(s) associated with a communication session, one or more session type(s) associated with each of the all possible communication nodes, and the like.

Thereafter at 350, the communication node can determine if the optimized communication node, identified at 340, is within an at least one first communication node comprising a first network or within an at least one second communication node comprising a second network. In one exemplary embodiment, the set of business rules stored at the communication node, as discussed above, can optionally be used to analyze a network type and/or network location of a determined optimized communication node. It is also contemplated, by way of additional embodiments, that the list of communication nodes can include a network type acceptance criteria as a priority factor. Additional embodiments are contemplated where the determination of a network type can be made based on business rules stored at another network location. In additional embodiments, it is further contemplated that the determination of network type is based on whether or not the optimized communication node is located within a private network (i.e., associated with a particular IP address which represents a series of one or more but at least one unindexed IP address) that further comprises at least one "hidden" communication node having one or more but at least one unindexed IP address, otherwise generally known as "hidden" IP addresses. In these embodiments, this determination step at 350 may further comprise additional analyses to determine if the network type is a hidden network, and in one example, if so, if the representative IP address is hiding an optimized communication (e.g., a next-hop node or a destination node) which may have an unindexed IP address. The methodology associated with these additional analyses will be discussed in more detail with reference to FIG. 5, below.

Yet still further embodiments contemplate where the network type (and in additional exemplary embodiments, a network address family type) is predetermined (i.e., at a local communication node database, or the like), and in these exemplary embodiments, a communication node will not be listed or prioritized as part of the list of communication nodes unless such communication node accepts communication sessions with a certain network type which corresponds to that of the given communication session's predetermined routing information further comprising a destination node network type.

If a communication node identified as an optimized communication node at 340, is determined at 350 to not be within a first network, the communication node at 360 can modify an abstraction layer of the communication session. In this exemplary embodiment, one or more, but at least one, abstraction layer(s) can be modified by altering an implementation instruction which corresponds to a set of functionality of the abstraction layer, to allow transmission of that communication session to the optimized communication node. Inventive aspects of this modification will be discussed in more detail with reference to FIG. 5.

Generally, in communication systems and networks, a communication session can have elements and characteristics that can be characterized using the "Open Systems Interconnection" model or the "OSI" model. The OSI model is a conceptual model that characterizes and standardizes the communication functionality of a computing system and its corresponding communication sessions, without regard to the underlying internal structure and technology of such system and sessions. Generally, in the OSI model, a communication session can be partitioned into seven abstraction layers. As used in this specification and the claims, an abstraction layer can chiefly be defined as a way of hiding the implementation details of a particular set of functionality, allowing a separation of applications and the like to facilitate interoperability between layers, hosts, and ultimately computing systems, as well as platform independence, the general concept of implementing a process on various computing devices with none or very few changes to the process between devices. An abstraction layer can also be known as an "abstraction level."

For purposes of this exemplary method 300, the OSI model has two major components, an abstract model of vertical networking (i.e., the seven-layer model) and a set of specific protocols. According to the seven-layer model, each abstraction layer serves the layer above it and is served by the layer below it. By way of example, a layer that provides error-free communications across a network provides the path or route needed by applications above it, while it calls the next lower layer to send and receive packets that comprise the contents of that path or route. The protocols enable one host to interact with another host, at corresponding abstraction layers. As such, the protocols can be embodied as "implementation instructions," or as more commonly characterized as an interface between a computing device's software and its hardware, which control a number of functionality (i.e., the range of operations that can occur on the computing device), for example, data handling and memory operations, arithmetic and logic operations, control flow operations, and the like, generally known as input and output operations.

Upon the communication node determining the optimized communication node is within a second network (i.e., not within the same network as the originating node), at 360, the modification of an abstraction layer allows, in exemplary embodiments, for the transmission of the communication session from the communication node to the optimized communication node.

At 370, the communication node thereafter can modify the predetermined routing information comprising the destination node network type, so that, for example, to identify the network in which the optimized communication node resides (i.e., a network which is different than the network in which the communication session was initiated). Then, at 380, the communication session can be transmitted from the communication node to the optimized communication node. Method 300 thereafter ends at 390.

Additional and/or interchangeable elements, steps, and/or processes are contemplated at 370, including but not limited to, in one example, in addition to modifying predetermined routing information, to detect an upstream translation from one protocol (i.e., a first IP address, network type, and/or address family type) to a second protocol at another communication node not associated with the optimized communication node and/or the communication node in which the communication session was initiated (i.e., an "other" or "third" communication node). Upon this detection, a communication tunnel can be initiated and a portion of the communication session routed through this tunnel to a remote destination. In this exemplary embodiment, the portion of the communication session is rerouted through the tunnel to a remote destination to overcome a third party network address translation (NAT) implementation (i.e., an implementation provided by an ISP provider), which in this context is generally known as a "NAT traversal" implementation.

Additional embodiments of the communication tunnel contemplate the communication tunnel being encrypted, for example, via a security protocol suite such as Internet Protocol Security (IPSEC) protocol which establishes mutual authentication between communication nodes at initiation of the communication session over the communication tunnel and negotiation of cryptographic keys while the communication session is routed over the tunnel. Additional encryption protocols are further contemplated, for example, transport layer security (TLS), secure shell (SSH), and the like.

Additional and/or interchangeable elements, steps, and/or processes are contemplated at 370, including but not limited to, in a second example, where the communication node further comprises session border controller (SBC) software and/or protocol suite and upon modification of the predetermined routing information to recognize that the determined optimized communication node is within a second network, which is not the same as the network in which the communication session originated, the SBC element of the communication node acting as a gateway and/or a proxy between the first network and the second network.

In these exemplary embodiments, a gateway can be generally defined as networking hardware for interfacing between one or more networks which operate using one or more protocols. Generally, a gateway can have the operable functionality to provide protocol translators, impedance matching devices, rate converters, signal translators, and the like. Similarly, a proxy can generally be defined as an intermediary application which, when a transaction is initiated, for example, a data request is received, a communication session is initiated, or the like, the proxy application seeks resources to complete the transaction. When acting as an SBC for a communication session, in the context of these specific embodiments, a communication node can optionally act as either or both of a gateway and a proxy where transmission of the communication across more than one network is required. Additional embodiments are contemplated where destination node credentials can be managed and/or maintained so that encryption occurs via the communication tunnel but that system administrators and/or users need not apply security and/or encryption certificates or keys.

Further embodiments are contemplated where the SBC protocol within the communication node determines functionality and necessity of allocation of resources dependent upon at least in part on dynamic factors, including but not limited to, a session type for the communication session, session criteria, networks characteristics, network events, network type for either or both the origination node and/or the destination node, and the like. How these additional functional elements and/or processes interact with and/or operate within one or more networks will be discussed in more detail with reference to FIGS. 4 and 5.

Figure 4:
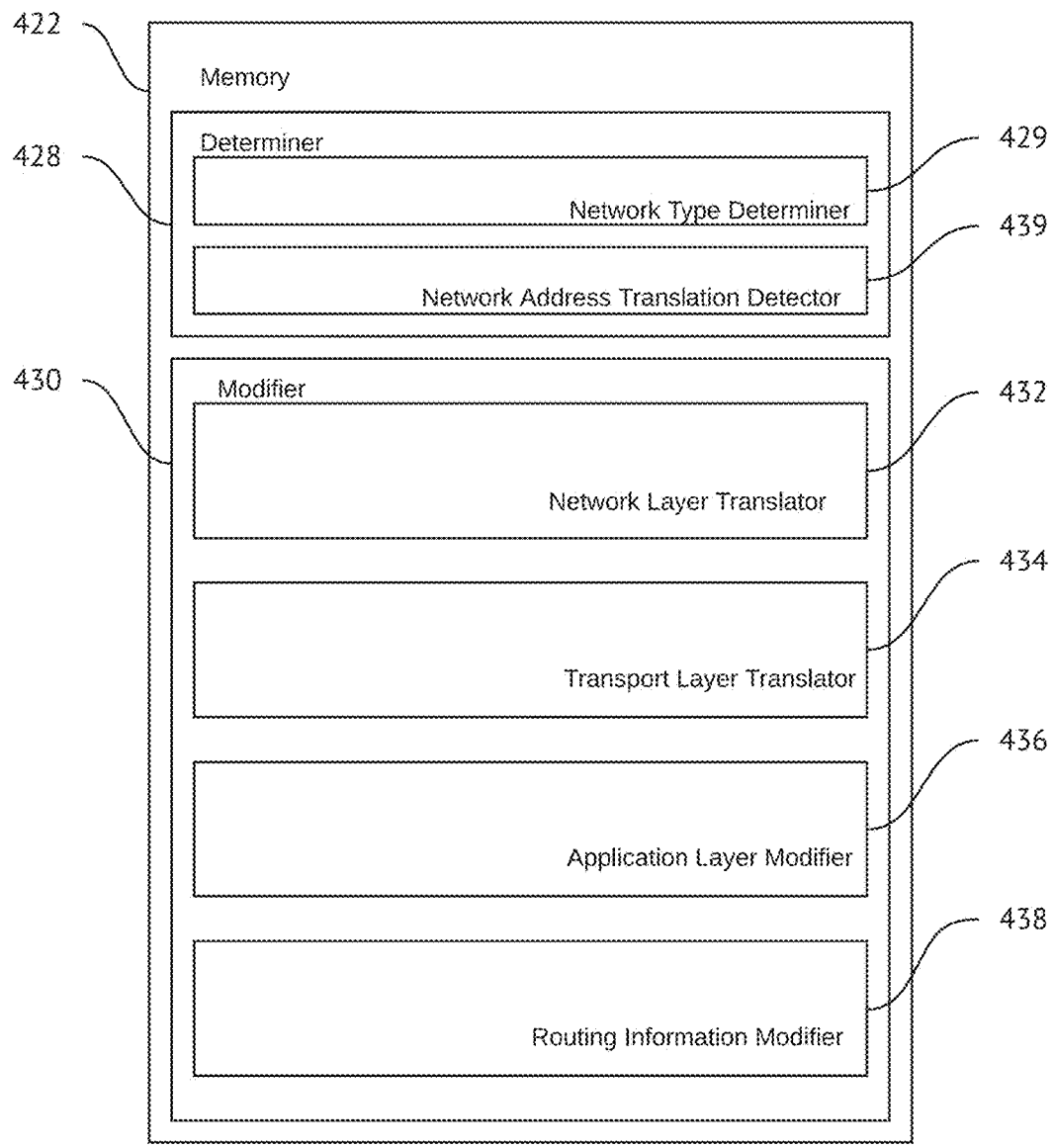
FIG. 4 illustrates one exemplary aspect of the present invention, an exemplary system embodiment for transferring a communication session from a first network to a second network.

FIG. 4 illustrates one exemplary aspect of the present invention, specifically a more detailed illustration and associated description of determiner 428 and modifier 430 in memory 422, as is also detailed with additional components in FIG. 2. For simplicity of illustration, this exemplary embodiment does not depict other applications and/or software stored in memory 422, network(s) and system components, such as hardware processors, memory, network(s), communication node(s) (such as, for example, communication nodes 220 illustrated in FIG. 2), network edge device(s) (such as, for example, other communication nodes 140 illustrated in FIG. 1), and the like however, each, all or any combination thereof of these components are contemplated for use as part of or in conjunction with determiner 428 and modifier 430.

Determiner 428 contains elements and components which embody an exemplary construction needed to determine a network type, detect an upstream protocol translation, and implement an alternative route or tunnel based on that upstream translation. It is further contemplated that the elements which compose determiner 428 are functionally operable as part of, by way of non-limiting examples, a communication node, network edge device, optimized communication system, and the like, to operate as a third-party-provided network address translation (NAT) implementation traversal device. Additional embodiments are contemplated where determiner 428 has other operable functionality, including NAT (i.e., direct abstraction layer modification and not traversal), a hidden or private network detector based on upstream activity, and the like.

Modifier 430, as herein illustrated, contains elements and components which embody an exemplary construction needed for modification of an abstraction layer. Additional embodiments are contemplated wherein modifier 430 can provide other functionality, including but not limited to, "flagging" or otherwise demarcating an upstream communication session as having prior and/or contemporaneous modifications to any or all of the following: a network layer; a transport layer; and an application layer, based on, for example the nature of the communication (i.e., whether the data which comprises the communication session is inbound or outbound from a communication node), and the like.

As illustrated in FIG. 4, determiner 428 comprises a plurality of computing elements, including network type determiner 429 and network address translation detector 439. Modifier 430 also comprises a plurality of computing elements, including network layer translator 432, transport layer translator 434, application layer modifier 436 and routing information modifier 438. Additional embodiments are contemplated with additional and less computing elements, and in one example, each element can be contained in a separate memory space or computing module. It is contemplated that each computing element illustrated may operate individually, one at a time, either or both in sequential and random order(s), in any combination of grouping(s), simultaneously, or in any other order or grouping as is functionally necessary to execute operations as dictated by one or another system such as, for example, system 200 and their associated components, in this example, OCS 210 or networks 260, 270, as each is illustrated in FIG. 2, respectively.

In this exemplary embodiment, determiner 428 and modifier 430 can function independently or within a number of exemplary environments, such as but not limited to, being at least one of an operatively connected component for use on or with communication nodes (such as, for example, communication nodes 220 illustrated in FIG. 2), network edge devices (such as, for example, other communication nodes 140 illustrated in FIG. 1), or any other communications or computing device operatively connected to a network (such as, for example, networks 160, 260, 170, 270). For simplicity of the written description contained in this section relating to FIG. 4, the exemplary environment used shall be a "communication node," but as used herein, this term can mean any such communication node(s), network edge device(s), or any other communication or computing device(s) operatively connected to a network as defined in this paragraph, or used throughout this specification and the claims. Furthermore, devices referred or referenced to, but not otherwise assigned an element number in FIG. 4, are the same or substantially similar to those referenced or discussed throughout this specification and the claims. The lack of illustration and element number is not for purposes of limiting such devices to this specific exemplary embodiment and figure, but to further remove complication from the description of the inventive aspects described in detail herein.

Determiner 428, as part of the inventive concept, can function to determine a network type via network type determiner 429, for example, by analyzing received communication session parameters, which can comprise an originating node network type identifying a network. Additional embodiments are contemplated where network type determiner 429 analyzes an incoming communication session based on a set of business rules to determine a network type, for example, a network address family of an IP address included as part of session parameters, communication session received via a port to the public Internet or via a private network, and the like.

Determiner 428 can be further functionally operable to detect, via network address translation detector 439, whether or not an upstream translation from one protocol (i.e., a IP address, network type, and/or address family type) to a second protocol (i.e., a second IP address, second network type, and or second address family type) at another communication node not associated with an optimized communication node and/or a communication node in which the communication session was initiated (i.e., an "other" or "third" communication node). Upon this detection, a communication tunnel can be initiated and a portion of the communication session routed through this tunnel to a remote destination. In this exemplary embodiment, the portion of the communication session is rerouted through the tunnel to a remote destination to overcome a third party NAT implementation (i.e., an implementation provided by an ISP provider), which is this context is generally known as a "NAT traversal" implementation.

Modifier 430 can have a two-fold functionality of modifying one or more, but at least one, of a communication session's abstraction layers and modifying a communication session's predetermined routing information. Modifier 430, in such embodiments as exemplified in FIG. 4, can modify either or both of an abstraction layer and predetermined routing information based on any of the following individually or in conjunction with one another, by way of example and in no way limited to: predetermined routing information of a communication session, session parameter(s) of a communication session, a set of business rules received to or stored at a computing device associated with modifier 430, a session criteria of an optimized communication node, and a session type of an optimized communication node.

As noted above, an IP address is ordinarily a numerical label assigned to any computing device which indicates where the computing device is located within a network.

There is more than one type of address family or address type, including but not limited to, Internet Protocol version 4 (IPv4), Internet Protocol version 6 (IPv6), and the like. IP addresses can also, optionally, be classified into whether or not the IP address represents a communication node within a public network, such as, in one example, the public Internet, or a private network. Also as noted above, a private network IP address can optionally be determined to represent a series comprising of one or more but at least one communication node associated with one or more unindexed IP addresses.

When a communication session is received at a communication node and a determiner determines that the communication session's session parameters contain a first address family which is not compatible with the address family of a determined optimized communication, modifier 430's element network layer translator 432 can modify one or more, but at least one, implementation instruction associated with the set of functionality that comprises the network layer of the communication session, to translate at the network layer from a first IP address to a second IP address. The translation as contemplated by network layer translator 432 can be based on any combination, but at least one of, the following: a set of business rules received to or stored at a communication node, a determination that the optimized communication node is within a network (i.e., a second network) which is not functionally compatible with a network (i.e., a first network) from which a communication session originated, a transport layer protocol of a communication session, and session parameter(s) of a communication session.

According to the OSI model, a network layer is an abstraction layer which provides the functional and procedural means of transferring variable length data sequences, each of which can generally be defined by the term "datagram," from at least one communication node to another connected to the same network. Also, in general terms, a network layer can translate a logical network address into a physical machine address. For illustrative purposes to further define a network layer, a network in this exemplary context may be contemplated to be a medium to which many communication nodes are connected, and each and every of those communication nodes has at least one network address and which permits those communication nodes connected to the network to transfer message(s) (or as the case as illustrated in this exemplary embodiment, communication sessions) to other communication nodes connected to the network by, for example, providing the content of the message or communication session and an address of a destination or terminating node for that message or communication session. In a traditional communication network or system, the network may passively allow the network to find a way to deliver the message or communication to the destination or terminating node. However, in an optimized communication network, such as, for example, communication system 100 as illustrated in FIG. 1, optimization components, such as OCS 110 (including but not limited to OCS modules 112 and OCS databases 114), can direct the message or communication session through an optimized communication node, including but not limited to, through intermediary or intermediate nodes.

For this exemplary embodiment, network layer translator 432 modifies an implementation instruction associated with a set of functionality that comprises the network layer following a communication node receiving a communication session. Upon receipt of the communication session and modifier 430 having access to the communication session, network layer translator 432 reviews each layer of the communication session, to determine, for example, which of the protocols contained within the communication session are the protocols (i.e., the "implementation instructions") associated with the network address(es) (i.e., originating node network type received at a communication node at initiation of communication session as part of the session parameters) and machine address(es) of the communication session. This analysis or algorithmic determination can be completed based on, for example, a set of business rules received to or stored at the communication node. If a determination is made that the optimized communication node is within a network which is not the network associated with the communication session (i.e., the originating node network type), network layer translator 432 can modify the protocol(s) or implementation instruction(s) which state the network address(es) and machine address(es) by, for example, rewriting the string of numbers which is in the first address family format to a string of numbers in a second format, which, for example, convey the same or substantially the same information in the address family format (e.g., the "network type" format) acceptable to the optimized communication node.

In additional embodiments of network layer translator 432, the analysis or algorithmic determination can be based on a number of additional or other characteristics, including, but not limited to, at least one transport layer protocol of a communication session, and at least one other session parameter of a communication session. In these additional exemplary embodiments, under the OSI model, each abstraction layer is served by a "lower" abstraction layer and serves a "higher" abstraction layer. In this particular example, the network layer is a lower abstraction layer than a transport layer, and therefore, any transport layer protocols can be reviewed as part of the analytical review of the lower network layer protocols. In these embodiments, a transport layer protocol can be defined as implementation instructions which define a set of functionality associated with defining host-to-host communication services or applications between one or more communication nodes, such as, for example, connection-oriented data stream support, reliability support, data flow control, multiplexing, and the like.

Generally, if a message or communication session is too large to be transmitted from one communication node to another via a one network, another network or an optimizing element at a communication node or operatively coupled system, such as, for example, OCS 110, 210 as illustrated in FIGS. 1 and 2, in one exemplary embodiment, can implement message delivery by splitting the message into several fragments or packets at one communication node, sending the fragments independently, and reassembling the packets at another communication node. In another exemplary embodiment, an optimizing element, such as, for example, OCS 110 of FIG. 1 can optionally, or not, dismantle a large message or communication session into packets, based on a number of factors, including but not limited to, a set of business rules received to or stored at the communication node, a list of communication nodes (in this specific example, the list of communication nodes being analyzed based on the communication nodes accepting communication sessions with the session type and size of the particular communication session), and the like. It is further contemplated that the same, substantially the same methodology can be used by network address translation detector 439 upon initiation of a communication tunnel upon detection of an upstream network address translation.

Transport layer translator 434, can, in various exemplary embodiments, randomly, in sequence, following or simultaneously with the network layer translation by network layer translator 432, modify one or more, but at least one, implementation instruction or protocol associated with the set of functionality comprising a user datagram protocol at a transport layer. Transport layer translator 434, can translate or modify, for example, a source service port and a destination service port based on any number of functionally necessary characteristics, including but not limited to any or a combination of the following: a set of business rules received to or stored at a communication node, a session type of a communication session (in a specific example where the communication session comprises any combination of audio data and video data), and an application layer protocol associated with the communication session.

According to the OSI model, a transport layer is an abstraction layer which is responsible for delivering data to an appropriate application process on one or more "host" computing devices, such as, for example, but not limited to, one of a next hop or other intermediary communication node or a destination communication node. To accomplish this data delivery, or transport, a transport layer can include any number or implementation instructions or protocols which direct statistical multiplexing of data from different application processes. Data multiplexing, in these exemplary embodiments, can be defined as combining any combination of analog or digital data signals or communication sessions into a single signal. This can include but is not limited to forming data packets and either simultaneously or thereafter adding source and destination port numbers in the header of each transport layer data packet. For these exemplary embodiments, the originating and destination IP address(es) (which, in these exemplary embodiments can optionally be a rewritten IP addresses translated at network layer translator 432), the port numbers, and multiplexed data signal can constitute what is generally known in the industry as a network socket, otherwise defined as an identification address of a "process-to-process" communication session. In the OSI model, the actual process-to-process communication session identified by the transport layer address is functionality supported at a session layer.

The implementation instructions or protocols commonly modified by the transport layer translator 434 can include, as stated above, one or more, but at least one user datagram protocol or "UDP." A UDP is a transmission protocol which, for example, provides one or more algorithms to verify data integrity and uses port numbers for addressing different functions at a source communication node, intermediary communication node, and destination communication node for the particular datagram, and the like. In these exemplary embodiments, a UDP generally has no introduction or "handshaking" dialogues, so there is no guarantee of delivery, ordering, or duplicate protection and is commonly suitable for purposes where error checking and correction is either not necessary or is performed at an application, avoiding the overhead of such processing at the network interface level. Communication networks, such as, for example, communication system 100 illustrated in FIG. 1, and other time-sensitive applications often use a UDP because dropping packets is preferable to waiting for delayed packets, which may not be an option in a real-time system. In additional embodiments, as contemplated herein, communication systems, such as those illustrated in FIG. 2, which can include optimizing elements, such as OCS 210, can direct communication sessions containing UDP transport protocol(s) to either or both limit or substantially eliminate such packet dropping and delay based on any number or combination of optimizing characteristics, such as, for example and no way in limitation, a set of business rules received to or stored at a communication node, including transport layer translator 434, a list of communication nodes (in this specific exemplary embodiment, where possible optimized communication nodes have a specified network type, such characteristics as network events and network conditions, limit or substantially eliminate such packet dropping or loss), and the like.

For purposes of illustration, a source service port can generally be defined as a communication session "endpoint" in an operating system of a computing device. In this example, a port can be associated with an IP address of a host and a protocol type of a communication session, and where it is the source service port, completes the origination address of the communication session. The port number can be encoded in the transport protocol packet header and may be interpreted by the sending (i.e., the source or originating communication node), receiving (i.e., the destination or terminating communication node), and any intermediary communication nodes or other network infrastructure components.

Also by way of example, a destination service port can generally be defined as the port which completes the termination address of a communication session. The port number can be encoded in the transport protocol packet header and may be interpreted by the sending (i.e., the source or originating communication node), receiving (i.e., the destination or terminating communication node), and any intermediary communication nodes or other network infrastructure components.

Once transport layer translator 434 has access to the communication session (e.g., whether or not a network layer translation is required to transfer the communication session to an optimized communication node), transport layer translator 434 can review each layer of the communication session to determine, for example, either or both of the transport layer and the associated transport layer protocols based on a set of business rules received to or stored at a communication device to which transport layer translator 434 is an integrated or associated element. In this specific exemplary embodiment, when at least one of the transport layer protocols is a UDP and the network layer has been translated so that an IP address which is associated with a first network (i.e., an originating node network type) is rewritten to a second IP address (i.e., a destination node or optimized communication node within a second network which is not functionally compatible with the first network), transport layer translator 434 can, for example, translate either or both of a source service port and a destination service port by rewriting the string of numbers associated with either or both of the respective port addresses in one format to a string of numbers which convey the same or substantially the same information in a second format. Additional embodiments are contemplated where this translation can optionally occur in the absence of a translation from a first IP address to a second IP address at the network layer via network layer translator 432. Additional embodiments are further contemplated where the transport layer protocol which can be modified is a protocol other than a UDP, for example, a transmission control protocol or "TCP," a stream control transmission protocol or "SCTP," or the like. These additional embodiments contemplate an application requiring error correction facilities at the network interface level, which, as stated above, is not common in a standard communications system.

In additional embodiments of transport layer translator 434, the analysis or algorithmic determination of either or both of the transport layer and associated transport layer protocol(s) can be based on a session type of a communication session, regardless if a network layer has also been translated, if a particular communication session type includes any combination of audio data, a digital data stream containing digital signals in the audible range (i.e., sound), and video data, a digital stream containing a representation of moving visual images (i.e., a series of digital images displayed in rapid succession). UDP transport protocols can frequently be used where a communication session contains either or both of audio and video data because a UDP is stateless (i.e., data packets are individually addressed and routed based on an information data string carried as part of each data packet without prior arrangement of a data channel) and does not retransmit data packets if any are lost, both of which are beneficial in "real-time" applications such as, for example, VoIP communication applications, chat features, and online games.

In other exemplary embodiments of transport layer translator 434, the analysis or algorithmic determination of either or both of the transport layer and associated transport layer protocol(s) can be based on an application layer protocol associated with a communication session. Application layer protocols typically include implementation instructions for identifying communication partners, determining resource availability, synchronizing communication, and the like. In these exemplary embodiments, under the OSI model, the transport layer is a lower abstraction layer than the application layer, and therefore the transport layer functionality serves the application layer, and in this particular example, any application layer protocols can be reviewed as part of the analytical factor in the review of any lower transport layer protocols. Yet still, additional embodiments contemplate that the application layer protocol(s) which can be an analytical factor characteristics used by transport layer translator 434 can be either or both of a real-time transport protocol or "RTP" and a session initiation protocol or "SIP."

In these exemplary embodiments, an RTP can be defined as an application-layer protocol for the real-time transport of data such as audio and video data. Generally, RTP is equipped to handle the characteristics of IP routing, such as missing packets and out-of-sequence aggregation of packets. An application layer control (signaling) protocol can generally function to for setting up, modifying, and disconnecting communication sessions involving one or more participants, such as two-party (unicast), or multi-party sessions comprising one or more media streams. SIP, on the other hand, generally does not handle the actual transmission of the application data or media streams. SIP is an application layer control for setting up, modifying, and disconnecting communications involving one or more users. Usually, a protocol such as RTP actually delivers the application data or media streams. SIP is similar to the HTTP or SMTP protocols in that a SIP message comprises headers and a message body. SIP can generally be regarded as the enabler protocol for telephony VoIP services.

Application layer modifier 436 in modifier 430 can modify an application layer, for example, one or more, but at least one implementation instruction(s) or protocol(s) that comprise a session description protocol or "SDP." Under the OSI model, an application layer is an abstraction layer which is the user (i.e., communication session user, or end-user) interface responsible for displaying or otherwise transmitting received communication session information to a user, by way of example but not in limitation, on a display screen, over a telephone handset, or the like. Also, generally, this layer specifies the shared protocols and interface methods (i.e., the protocol(s) and interface(s) that a source communication node and a destination communication node, as well as any intermediary communication node(s), have in common) used by communicating communications nodes within a network.

An SDP can generally be defined as a format for describing streaming media initialization parameters, for example, intended for describing multimedia (i.e., any combination of audio, video, and data session types) communication sessions for the purposes of session announcement, session invitation, and parameter negotiation. In exemplary embodiments, an SDP can comprise one or more, but at least one of the following: a communication session announcement, a communication session invitation, and session parameter negotiation data. According to the Internet Engineering Task Force (IETF®), a communication session announcement can be defined as a mechanism by which a session description is conveyed to users (i.e., communication system users or end users) in a proactive fashion, in one example, where the communication session is not explicitly requested by a user. A communication session invitation, on the other hand, can be defined as a handshake or request where a communication session initiated at a source or originating communication node is "accepted" at a destination or terminating communication node. Also, session parameter negotiation data can generally be defined as data where an initiating communication session "constructs" an "offer" SDP session description that lists the session types and other parameters, such as for example, codecs (i.e., programming for encoding or decoding a digital data stream) and other SDP parameters that the source or originating communication node is willing to use. In exemplary embodiments, this "offer" session description is sent to a destination communication node, which can optionally choose from among the session types, codecs and other session description parameters provided, and thereafter generate an "answer" session description with accepted parameters, based on that choice. The "answer" session description can be sent back to the originating or source communication node, thereby completing the session negotiation and enabling the establishment of the negotiated session type(s). Additional embodiments are contemplated where the originating and destination communication nodes can also be intermediary communication nodes.

To modify an implementation instruction associated with a set of functionality that comprises an SDP, application layer modifier 436 can rewrite any one or a combination of a communication session announcement, a communication session invitation, and session parameter negotiation data. In exemplary embodiments, application layer modifier 436 can modify any of these elements, for example, to address a modification at either or both of the network layer and the transport layer. Specifically, and as will be discussed in more detail with reference to FIG. 5, if the UDP modified by transport layer translator 434 is, in one exemplary embodiment, a SIP transport protocol, then an SDP header and body must be rewritten from one format to a second format to address any modifications made to either or both of source and destination port identifiers associated with a multiplexing functionality of a UDP, specifically in this exemplary embodiment, for voice data session types. Additional embodiments are further contemplated where a transport layer protocol is an RTP transfer protocol or other transfer protocol, with any combination of SDP elements being modified to address unicast and multiplexing functionality associated with any combination of voice, video, and computing data.

Modification of the SDP by application layer modifier 436 can be based, in exemplary embodiments as contemplated herein, for example, on any one or combination of a set of business rules received to or stored at a communication node, a session type of a communication session, a translation at a network layer, and a modification at a transport layer. Since an application layer is the highest abstraction layer and does not "serve" any higher abstraction layer, higher level protocols cannot be analytical factors for determining whether or not an application layer element either can be or should be modified. However, whether or not lower level abstraction layer protocols have been modified can be a determining characteristic, for example, whether or not a UDP or address family has been modified. Additional embodiments are contemplated where any one or a combination of the application layer protocol elements are modified when either, both, or any combination thereof of a network layer protocol (i.e., address family or type), a transport layer protocol that is a SIP, and a transport layer protocol that is an RTP are, at least in part, modified to address transmission from a communication node in a first network to an optimized communication node in a second network.

Once a communication session has been either or both of analyzed and modified by network layer translator 432, transport layer translator 434, and application layer modifier 436, routing information modifier 438, can optionally modify predetermined routing information associated with a communication session. In one exemplary embodiment, when a communication node receives a communication session, as part of an initiation of the communication session, the communication node receives a number of session parameters, including predetermined routing information which identifies a network type in which an originating node of the communication session resides. As discussed above, once an optimized communication node is determined to be within a network (i.e., a second network) which is not the same network type associated with the predetermined routing information for the originating node, the predetermined routing information may need to be modified to rewrite the header of the communication session to direct the communication session to the optimized communication node. This modification can include, for example, analysis and algorithmic determination based on a number of characters, including but not limited to, a set of business rules received to or stored at a communication node, a determination of an optimized communication node which is not a predetermined next hop communication node, any one or a combination of the translations and modifications as discussed in reference to this FIG. 4, a network type, a network condition, a network event, and the like.

The operation of certain aspects of the inventive concept as illustrated in the exemplary embodiment depicted in FIG. 4 will now be described with respect to FIG. 5. FIG. 5, as described below, illustrates a logical flow diagram generally showing one embodiment of a process or method for optimizing a communication session by network type determination and abstraction layer translation, where the communication session is traveling from a first network comprising at least one first communication node to a second network comprising at least one second communication node. The method, as herein contemplated, may include, for example, any of the devices and systems described above in reference to FIGS. 1 through 4. Method 500 of FIG. 5 can be implemented in part, or whole, within network communication node 220 of FIG. 2 or other communication nodes 140 of FIG. 1, and more specifically, within determiner 428 and modifier 430 as illustrated in FIG. 4. Additional embodiments contemplate that method 500 may operatively function on any communications or computing device operatively coupled to a network. Furthermore, it is contemplated that steps can be added and/or removed from method 500, or that method 500 can optionally be integrated into method 300 disclosed in reference to FIG. 3. The following detailed description is, therefore, not to be taken in a limiting sense, and various embodiments envisioned by adding and/or removing steps in the process may be readily combined, without departing from the scope or spirit of the invention.

For simplicity of the written description contained in this section relating to FIG. 5, the exemplary environment used shall be a "communication node," but as used herein, this term can mean any such communication node(s), network edge device(s), or any other communication or computing device(s) operatively connected to a network as defined in this paragraph, or used throughout this specification and the claims. Furthermore, devices referred to or referenced are the same or substantially similar to those referenced or discussed throughout this specification and the claims. The lack of illustration and element number is not for purposes of limiting such devices to this specific exemplary method and figure, but to further remove complication from the description of the inventive aspects described in detail herein.

Method 500 starts at 510. Thereafter, at 550, a determination is made at a communication node where an initiation request for a communication session has been received (i.e., where the communication node is one of an originating node, an intermediary node, or a destination node) whether or not an optimized communication node (such as is determined, for example, in method step 340 illustrated in FIG. 3) has a network type which is the same as the originating node network type identifying a first network, associated with the initiated communication session, session parameters. If the optimized communication node is within the first network (i.e., the optimized communication node is not within a second network and therefore does not have a second network type), the communication session thereafter has its predetermined routing information modified at 570, so that the optimized communication node can accept the communication session (based on, at least in part, one or more other priority factors for determining communication pathways discussed elsewhere in this specification and the claims, but irrespective, for example, of address family associated with the communication session, session type, session criteria, network conditions, and the like), as a "next-hop" or destination for the communication session. Following this modification of the predetermined routing information, a communication session can thereafter be transferred to the optimized communication node at 580, with method 500 ending at 590.

If, at 550, a determination is made at a communication node that the optimized communication node is within a second network and therefore has a network type which is different from the originating node network type identifying a first network, associated with the session parameters of the initiated communication session, the communication node can translate at the network layer at 560, a first IP address into a second IP address, where the second IP address represents and identifies the location of the optimized communication node as residing within the second network.

Additional embodiments are contemplated where a determination at 550 can further include detection (such, as for example, via network address translation detector 439 illustrated in FIG. 4) whether or not an upstream translation from one protocol to a second protocol at another communication node not associated with an optimized communication node and/or a communication node in which the communication session was initiated (i.e., an "other" or "third" communication node) has occurred. This detection represents a NAT traversal method step, in which a communication tunnel can be initiated and a portion of the communication session routed through this tunnel to a remote destination for, in one example, to circumvent a private network containing a number of un-indexed IP address locations (i.e., communication nodes and/or other computing devices) defined by a single representative IP address.

Thereafter, at 562, following the determination that the optimized communication node is within a second network, a second determination can be made, commonly by a computing element such as transport layer translator 434 as illustrated in FIG. 4, whether or not a communication session has as its transport layer user datagram protocol (UDP) either or both of a real-time transport protocol (RTP) or session initiation protocol (SIP) as one of its transport layer protocols. It is contemplated that a communication session can have either or both of an RTP and SIP as transport layer protocol(s), as a communication session can have any number of transport layer protocols to help facilitate transfer of the communication session through various interconnected networks, especially, in one specific example, the public Internet which is hosted by various different entities via a multitude of different interconnected computing devices. Various transport protocols can be used, for example, for different types of data which can comprise a communication session, for example, audio, video, computing data, or any combination thereof. This determination is critical at 562, when two or more networks are determined (i.e., a communication session originating in a first network which needs to terminate in a second network).

If at 562, a determination is made that a transport layer contains an RTP transport protocol, the UDP can be modified at either or both of the source and destination service ports at 564, to, in one aspect, "clean up" the transport layer to accommodate the earlier translation from the first IP address to the second IP address at 560. As is noted above, source and destination service ports can be communication session endpoints within an operating system, which have at least one associated IP address, which completes each of the originating and terminating addresses for the communication session.

If at 562, a determination is made that the transport layer contains a SIP as at least one of its transport layer protocols, the UDP can be modified at the source and destination service ports at 566, to, in one aspect, "clean up" the transport layer to accommodate the earlier translation from the first IP address to the second IP address at 560. This modification, as contemplated at method step 566, may occur through the same or similar functionality as required to modify the RTP source and destination service ports. Since a SIP session is different than RTP session, this method step 566 is described for illustrative purposes only to show the distinction necessitated thereafter by step 568, as a communication can have any number of transport protocols, including any combination of either or both of SIP and RTP. SIP and RTP are not interchangeable due to the data types (i.e., session types) that can be associated with each of these transport protocols, respectively.

Additional embodiments of method 500 are contemplated where a transport layer UDP can comprise both an RTP and SIP transport layer protocols. In these exemplary embodiments, it is contemplated that method steps 564, 566, and 568 can occur, for example, sequentially or simultaneously. Further additional embodiments are contemplated where a transport layer UDP does not comprise either of an RTP or SIP transport layer protocols. In these exemplary embodiments, it is contemplated that no UDP modification(s) occur, and, for example, the method resumes at method step 570.

Following the UDP source and destination port translation of the SIP transport protocol at 568, a session description protocol (SDP) of the SIP communication session can be modified at an application layer, to, in one aspect, "clean up" the application layer to accommodate the earlier translation from the first IP address to the second IP address. As noted above, SIP is generally a transport layer protocol for signaling and controlling communication sessions which contain certain session types of data, for example, audio, and video data. SIP works in concert with several other protocols, such as for example, UDP, transmission control protocol (TCP), stream control transmission protocol (SCTP), and the like, and is commonly used for setting up, modifying, and tearing down voice and video data communication sessions. An SDP is generally a transport protocol that accompanies streaming voice and video data communication sessions (i.e., SIP communication session involving voice data, video data, or any combination thereof). Where a SIP communication session has had source and destination service port identifiers modified at 566 to remain consistent with an earlier network layer translation at 560, from a first IP address to a second IP address, an associated SDP can have head and body identifiers rewritten from one format to a second format to address, at 568, the UDP modifications.

Additional embodiments are contemplated where additional transport layer protocols, which often times are dependent on the session types of a particular communication session, can be modified based on any combination of an IP address translation at 560, UDP modifications at 564, 566, and an SDP modification at 568.

Thereafter, either or both of the modified SIP and RTP communication sessions are modified at 570 by the communication node to revise the predetermined routing information provided to the communication node as part of the session parameter(s) associated with the communication session and provided at the initiation of the communication session (as illustrated in FIG. 3 at method step 320), to identify the optimized communication node and its location within a second network. This modification at 570 for SIP and RTP communication sessions is the same or similar as discussed above, where the modification of the routing information is made, at least in part, so that the communication node within the first network can transfer the communication session to an optimized communication node within the second network. A communication session can thereafter be transferred to the optimized communication node at 580 and the method ends at 590.

Additional and/or interchangeable embodiments, elements, steps, and/or processes are contemplated at 570, where in addition to modifying the predetermined routing information comprising a destination node network type to identify the optimized communication node and a second network type, the communication node can act as a gateway and/or proxy between the first network and the second network via session border controller (SBC) software and/or protocol. In these exemplary embodiments, the SBC software and/or protocol within the communication node determines functionality and necessity of allocation of resources dependent upon, at least in part, dynamic factors, including but not limited to, a session type for the communication session, session criteria, networks characteristics, network events, network type for either or both the origination node and/or the destination node, and the like. In these exemplary embodiments, the communication node acting as a gateway and/or proxy contributes to the communication node acting to modify a communication and route and/or re-route outbound communication sessions (i.e., "from" the communication node, as opposed to "to" the communication node) transmitted via the communication node.

Additional exemplary embodiments are contemplated wherein an OCS, such as, for example, OCS 110, 210, as illustrated in FIGS. 1 and 2, upon receiving a communication session which has modifications made to its application layer, as described above with reference to step 568, the "flags" inherently created as part of the modifications require additional modifications to the session parameters of the communication session, for example, modifying an originating node network type to address a modified "origination" location of the communication session for downstream translation purposes, modifying the predetermined routing information further comprising a destination node network type to address a modified "termination" location of the communication session for upstream translation purposes, and the like.

In these exemplary embodiments, these additional and/or optional modifications can contribute to an OCS or communication node acting to modify a communication and route and/or re-route inbound communication sessions (i.e., "to" the OCS or communication node, as opposed to "from" the OCS or communication node) transmitted via a communication node.

Additional methods, aspects, and elements of the present inventive concept are contemplated in use in conjunction with individually or in any combination thereof which will create a reasonably functional method and system for optimizing a communication session from a first network comprising at least one first communication node to a second network comprising at least one second communication node. It will be apparent to one of ordinary skill in the art that the manner of making and using the claimed invention has been adequately disclosed in the above-written description of the exemplary embodiments and aspects. It should be understood, however, that the invention is not necessarily limited to the specific embodiments, aspects, arrangement and components shown and described above, but may be susceptible to numerous variations within the scope of the invention.

Moreover, particular exemplary features described herein in conjunction with specific embodiments and/or aspects of the present invention are to be construed as applicable to any embodiment described within, enabled thereby, or apparent therefrom. Thus, the specification and drawings are to be regarded in a broad, illustrative, and enabling sense, rather than a restrictive one. It should be understood that the above description of the embodiments of the present invention are susceptible to various modifications, changes, and adaptations, and the same are intended to be comprehended within the meaning and range of equivalents of the appended claims.

Therefore, we claim:

1. A method for optimizing a communication session from a first network comprising at least one first communication node to a second network comprising at least one second communication node, the method comprising:
receiving an at least one session parameter at a first communication node in the first network indicating initiation of the communication session, the at least one session parameter comprising an originating node network type identifying the first network, a session criteria, a session type, and a predetermined routing information for routing the communication session, wherein the predetermined routing information further comprises a destination node network type identifying a network within which a destination node is located;
retrieving to the first communication node from a local communication node database a list of communication nodes through which the communication session may be routed, wherein the list of communication nodes contains all possible communication nodes in both the first network and the second network, and wherein the list of communication nodes has a prioritization based at least in part on a session criteria and a session type of each of the all possible communication nodes;
identifying at the first communication node, based on a set of business rules stored at and executed by a processing unit of the first communication node, an optimized communication node from the list of communication nodes, wherein when the set of business rules is executed, the processing unit analyzes the list of communication nodes based at least in part on the at least one session parameter and the prioritization of the list of communication nodes;
determining at the first communication node if the optimized communication node is within the first network or within the second network;
upon the first communication node determining the optimized communication node is within the second network, modifying at the first communication node at least one abstraction layer of the communication session by modifying at least one implementation instruction for a set of functionality of the at least one abstraction layer to allow transmission of the communication session from the first communication node within the first network to the optimized communication node within the second network; and
modifying the predetermined routing information further comprising the destination node network type to identify the second network, wherein the communication session is transmitted from the first communication node within the first network to the optimized communication node within the second network.

2. The method of claim 1, wherein the first communication node is at least one of an originating node, an intermediary node, and a destination node.

3. The method of claim 1, further comprising the first communication node detecting an at least one translation from a first protocol to a second protocol occurring at an at least one third communication node and initiating an encrypted communication tunnel to a remote destination node, wherein the at least one third communication node is upstream from the first communication node, and wherein following the initiation of the encrypted communication tunnel a portion of the predetermined routing information is modified to transmit a portion of the communication session to the remote destination node.

4. The method of claim 1, wherein modifying the at least one implementation instruction for the set of functionality of the at least one abstraction layer comprises a translation at a network layer of a first Internet Protocol (IP) address of the communication session to a second IP address based on at least one of the set of business rules, a determination the optimized communication node is within the second network, at least one transport layer protocol, and the at least one session parameter.

5. The method of claim 1, wherein modifying the at least one implementation instruction for the set of functionality of the at least one abstraction layer comprises modifying at a transport layer a user datagram protocol (UDP) by a translation of at least one of a source service port and a destination service port based on at least one of the business rules, a determination the optimized communication node is within the second network, the session type of the communication session, and at least one application layer protocol.

6. The method of claim 5, wherein the at least one application layer protocol comprises at least one of a realtime transport protocol (RTP) and a session initiation protocol (SIP).

7. The method of claim 1, wherein the first communication node further comprises a session border controller (SBC), wherein when the first communication node determines the optimized communication node is within the second network the first communication node acts as a gateway and a proxy between the first network and the second network.

8. The method of claim 1, wherein modifying the at least one implementation instruction for the set of functionality of the at least one abstraction layer comprises modifying at an application layer a session description protocol (SDP) containing at least one of a communication session announcement, a communication session invitation, and a session parameter negotiation data, wherein the modification at the application layer is based on at least one of the set of business rules, a determination the optimized communication node is within the second network, the session type of the communication session, a translation at a network layer, and a modification at a transport layer.

9. The method of claim 8, wherein modification of the application layer occurs when the communication session at the application layer comprises at least one of an RTP and a SIP.

10. The method of claim 8, wherein modification of the application layer occurs if the translation occurs at the network layer or the modification occurs at the transport layer.

11. The method of claim 8, wherein modification of the application layer occurs if the translation occurs at the network layer and the modification occurs at the transport layer.

12. The method of claim 1, further comprising rerouting the communication session from the first communication node if the communication session has a modified SDP, wherein rerouting the communication session comprises modifying inbound predetermined routing information of the communication session for a destination node.

13. A system for optimizing a communications session from a first network comprising at least one first communication node to a second network comprising at least one second communication node, the system comprising:
a local communication node database for storing a list of communication nodes in both the first network and the second network through which the communication session may be routed; and
a first communication node in the first network operatively coupled to the local communication node database and comprising a hardware processor operative to:
receive an at least one session parameter at the first communication node indicating initiation of the communication session, the at least one session parameter comprising an originating node network type identifying the first network, a session criteria, a session type, and predetermined routing information for routing the communication session, wherein the predetermined routing information further comprises a destination node network type identifying a network within which a destination node is located;
retrieve to the first communication node from the local communication node database a list of communication nodes through which the communication session may be routed, wherein the list of communication nodes contains all possible communication nodes in both the first network and the second network, and wherein the list of communication nodes has a prioritization based at least in part on a session criteria and a session type of each of the all possible communication nodes;
identify at the first communication node, based on a set of business rules stored at and executed by the hardware processor, an optimized communication node from the list of communication nodes, wherein when the set of business rules is executed, the hardware processor analyzes the list of communication nodes based at least in part on the at least one session parameter and the prioritization of the list of communication nodes;
determine at the first communication node if the optimized communication node is within the first network or within the second network;
upon the first communication node determining the optimized communication node is within the second network, modify at the first communication node at least one abstraction layer of the communication session by modifying at least one implementation instruction for a set of functionality of the at least one abstraction layer to allow transmission of the communication session from the first communication node within the first network to the optimized communication node within the second network; and
modify the predetermined routing information further comprising the destination node network type to identify the second network, wherein the communication session is transmitted from the first communication node within the first network to the optimized communication node within the second network.

14. The system of claim 13, wherein the first communication node is at least one of an originating node, an intermediary node, and a destination node.

15. The system of claim 13, wherein the hardware processor is further operative to detect an at least one network address translation occurring at an at least one third communication node and initiating an encrypted communication tunnel to a remote destination node, wherein the at least one third communication node is upstream from the first communication node, and wherein following the initiation of the encrypted communication tunnel a portion of the predetermined routing information is modified to transmit a portion of the communication session to the remote destination node.

16. The system of claim 13, wherein modifying the at least one implementation instruction for the set of functionality of the at least one abstraction layer comprises a translation at a network layer of a first Internet Protocol (IP) address of the communication session to a second IP address based on at least one of the set of business rules, a determination the optimized communication node is within the second network, at least one transport layer protocol, and the at least one session parameter.

17. The system of claim 13, wherein modifying the at least one implementation instruction for the set of functionality of the at least one abstraction layer comprises modifying at a transport layer a user datagram protocol (UDP) by a translation of at least one of a source service port and a destination service port based on at least one of the business rules, a determination the optimized communication node is within the second network, the session type of the communication session, and at least one application layer protocol.

18. The system of claim 17, wherein the at least one application layer protocol comprises at least one of a real-time transport protocol (RTP) and a session initiation protocol (SIP).

19. The system of claim 13, wherein the first communication node further comprises a session border controller (SBC), wherein when the first communication node determines the optimized communication node is within the second network the first communication node acts as a gateway proxy between the first network and the second network.

20. The system of claim 13, wherein modifying the at least one implementation instruction for the set of functionality of the at least one abstraction layer comprises modifying at an application layer a session description protocol (SDP) containing at least one of a communication session announcement, a communication session invitation, and a session parameter negotiation data, wherein the modification at the application layer is based on at least one of the set of business rules, a determination the optimized communication node is within the second network, the session type of the communication session, a translation at a network layer, and a modification at a transport layer.

21. The system of claim 20, wherein modification of the application layer occurs when the communication session at the application layer comprises at least one of an RTP and a SIP.

22. The system of claim 20, wherein modification of the application layer occurs if the translation occurs at the network layer or the modification occurs at the transport layer.

23. The system of claim 20, wherein modification of the application layer occurs if the translation occurs at the network layer and the modification occurs at the transport layer.

24. The method of claim 13, further comprising rerouting the communication session from the first communication node if the communication session has a modified SDP, wherein rerouting the communication session comprises modifying inbound predetermined routing information of the communication session for a destination node.

* * * * *